(12) United States Patent
Yoshida

(10) Patent No.: US 6,259,514 B1
(45) Date of Patent: Jul. 10, 2001

(54) RANGEFINDER APPARATUS

(75) Inventor: Hideo Yoshida, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/427,009

(22) Filed: Oct. 26, 1999

(30) Foreign Application Priority Data

Oct. 30, 1998 (JP) .................................................. 10-310399

(51) Int. Cl.$^7$ .............................. G03B 13/00; G01C 3/00
(52) U.S. Cl. ........................ 356/3.04; 396/98; 396/106; 396/120; 396/625
(58) Field of Search .............................. 396/106, 98, 120, 396/125; 356/3.04

(56) References Cited

U.S. PATENT DOCUMENTS

| | | | | |
|---|---|---|---|---|
| 4,855,585 | * | 8/1989 | Nonaka | 396/106 |
| 5,200,602 | * | 4/1993 | Ikebe et al. | 396/106 |
| 5,361,117 | * | 11/1994 | Nonaka | 396/120 |
| 5,444,511 | * | 8/1995 | Seki et al. | 396/106 |
| 5,534,991 | * | 7/1996 | Maeda et al. | 396/106 |
| 5,572,012 | * | 11/1996 | Saito et al. | 396/106 |
| 5,610,680 | * | 3/1997 | Seki et al. | 396/106 |
| 5,614,984 | * | 3/1997 | Seki et al. | 396/106 |
| 5,742,524 | * | 4/1998 | Ito et al. | 396/106 |
| 5,754,281 | * | 5/1998 | Maeda | 396/120 |
| 5,864,720 | * | 1/1999 | Miyanari | 396/106 |
| 5,870,178 | * | 2/1999 | Akira | 396/106 |
| 6,026,246 | | 2/2000 | Yoshida et al. | 396/106 |

FOREIGN PATENT DOCUMENTS

| | | |
|---|---|---|
| 63-1918 | 1/1988 | (JP) . |
| 1-224617 | 9/1989 | (JP) . |
| 8-94919 | 4/1996 | (JP) . |
| 8-94920 | 4/1996 | (JP) . |

* cited by examiner

*Primary Examiner*—Stephen C. Buczinski
(74) *Attorney, Agent, or Firm*—Leydig, Voit & Mayer, Ltd.

(57) ABSTRACT

In a rangefinder apparatus, a clamp signal is set to $I_{c1}$, the number of accumulating operations of an output ratio signal in an integrating circuit is set to $N_1$, and a first distance measurement value $D_1$ is detected. If the first distance measurement value $D_1$ is larger than a reference distance $L_1$, then the clamp signal is further set to $I_{c2}$, which is lower than $CI_1$, the number of accumulating operations is set to $N_2$, and a second distance measurement value $D_2$ is detected. If the difference obtained by subtracting the first distance measurement value $D_1$ from the second distance measurement value $D_2$ is larger than a threshold value DD, then the clamp signal is set to $I_{c2}$, the number of accumulating operations is set to $N_3$, and a third distance measurement value $D_3$ is detected. A weighted average of the second distance measurement value $D_2$ and the third distance measurement value $D_3$ is obtained according to the number of accumulating operations $N_2$ and $N_3$, whereby the distance to the object is determined.

15 Claims, 24 Drawing Sheets

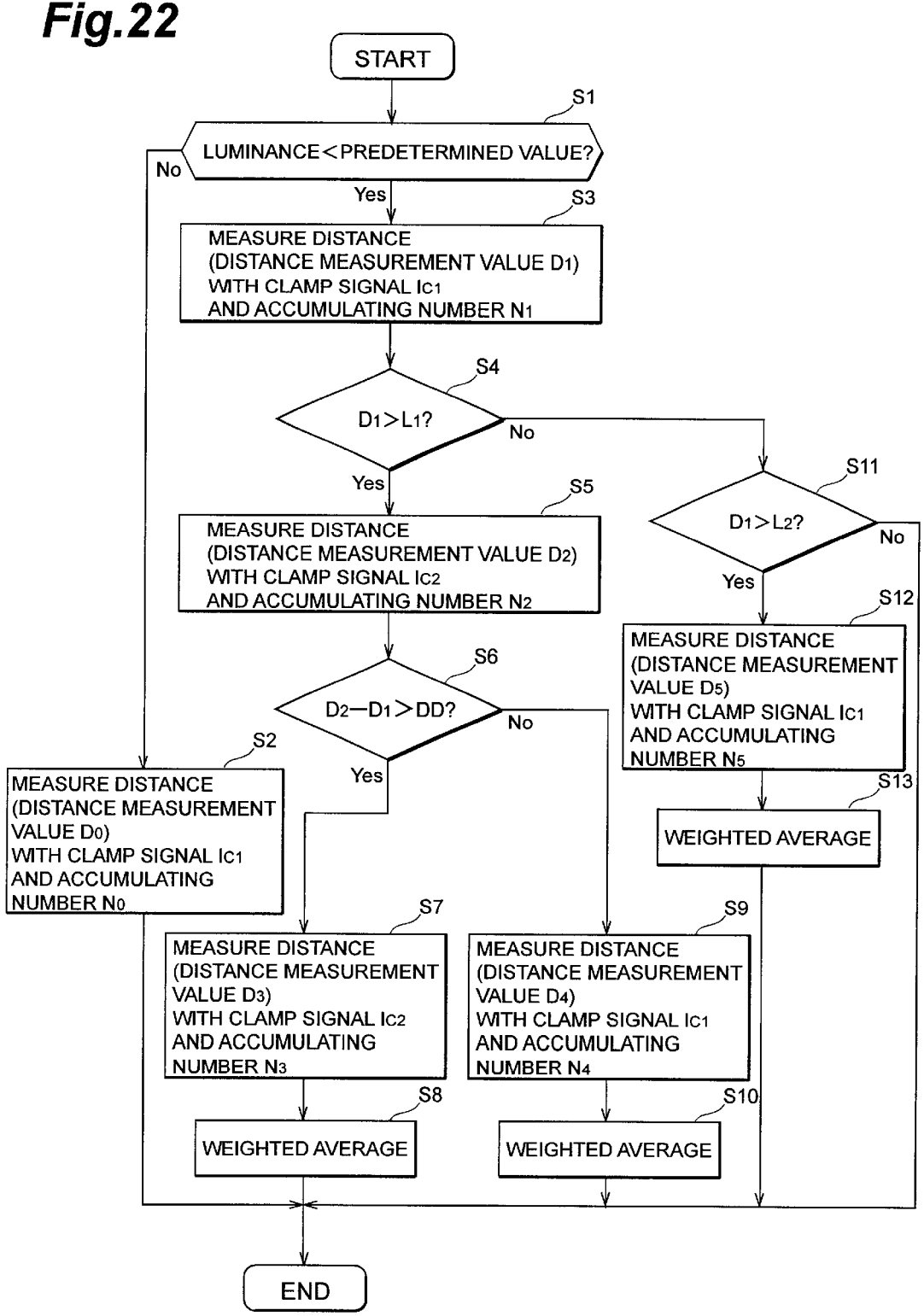

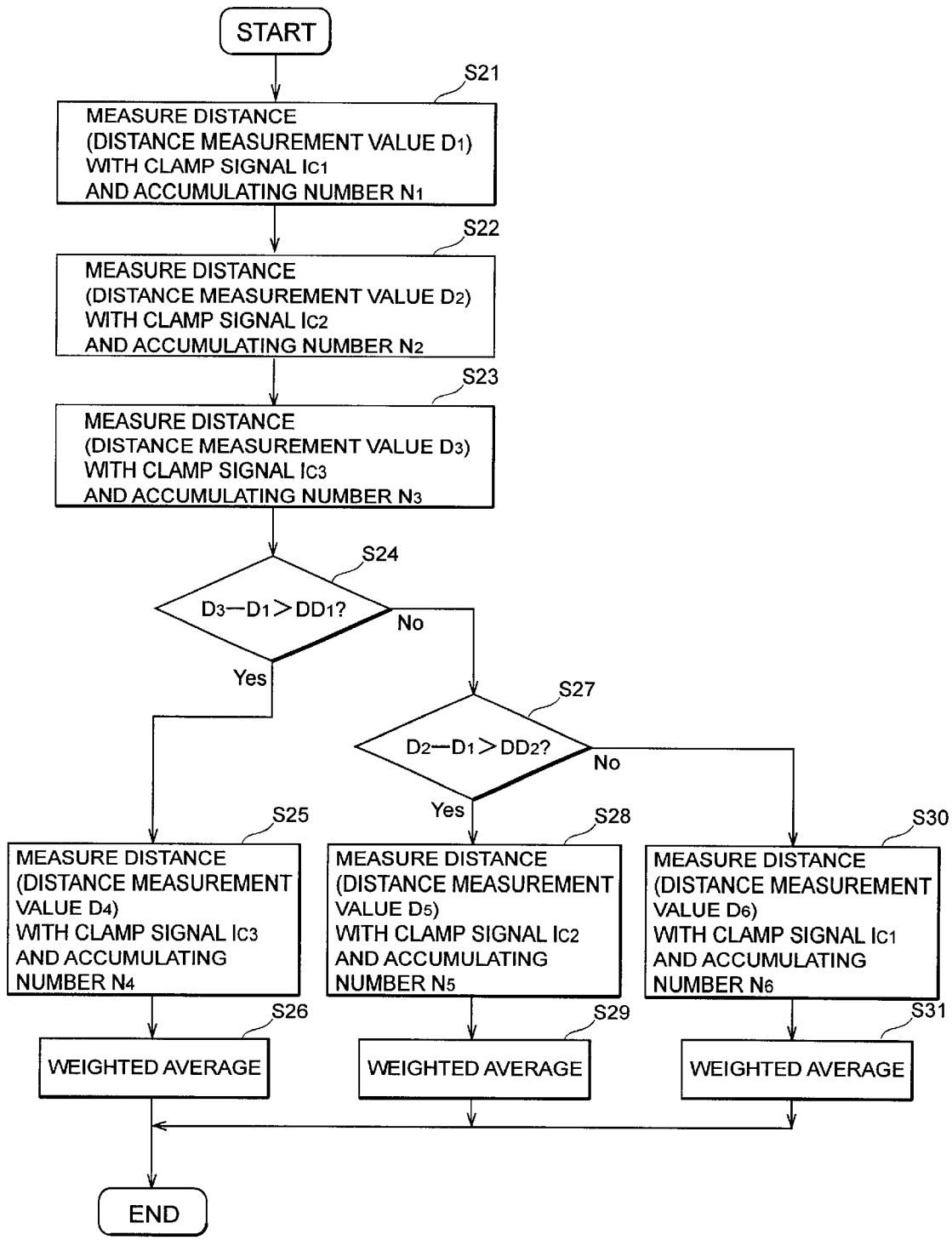

RANGEFINDER APPARATUS

BACKGROUND OF THE INVENTION

1. Field of the Invention

The present invention relates to a rangefinder apparatus for measuring the distance to an object, and, in particular, to an active rangefinder apparatus suitably used in a camera or the like.

2. Related Background Art

In active type rangefinder apparatus used in cameras and the like, an infrared light-emitting diode (IRED) projects a luminous flux toward an object to be measured, the reflected light of thus projected luminous flux is received by a position sensitive detector (PSD), a signal outputted from the PSD is arithmetically processed by a signal processing circuit and an arithmetic circuit and then is outputted as distance information, and the distance to the object is detected by a CPU. In general, since errors may occur when the distance is measured upon a single light-projecting operation, light is projected a plurality of times so as to obtain a plurality of distance information items, which are then integrated by an integrating circuit and averaged.

As such an active type rangefinder apparatus, one shown in FIG. 1 has conventionally been known. FIG. 1 is a configurational view of the rangefinder apparatus in accordance with first prior art.

In the rangefinder apparatus shown in this drawing, under the control of a CPU 110, a driver 112 drives an IRED 114 so as to make it output infrared light, which is then projected through a light-projecting lens 201 to an object to be measured. The infrared light reflected by the object is collected by a PSD 116 by way of a light-receiving lens 202, and the PSD 116 outputs two signals $I_1$ and $I_2$ according to the position at which the reflected light of the infrared light is received. A first signal processing circuit 118 eliminates a steady-state light component contained in the signal $I_1$ which becomes a noise, whereas a second signal processing circuit 120 eliminates a steady-state light component contained in the signal $I_2$ which becomes a noise.

According to the signals $I_1$ and $I_2$ from which the steady-state light components have been eliminated, an arithmetic circuit 132 determines an output ratio ($I_1/(I_1+I_2)$) by an arithmetic operation, and outputs an output ratio signal corresponding to the distance to the object. An integrating circuit 134 integrates the output ratio signals thus outputted from the arithmetic circuit 132 a plurality of times, thereby improving the S/N ratio. The signal outputted from this integrating circuit 134 (hereinafter referred to as "AF signal") corresponds to the distance to the object. Then, according to the AF signal outputted from the integrating circuit 134, the CPU 110 determines a distance signal by carrying out a predetermined arithmetic operation, and controls a lens driving circuit 136 according to this distance signal, so as to move a lens 138 to an in-focus position.

FIG. 2 is a graph showing the relationship between the AF signal outputted from the integrating circuit 134 in this first prior art and the distance to the object. In this graph, the abscissa indicates the reciprocal (1/L) of the distance L to the object, whereas the ordinate indicates the output ratio ($I_1/(I_1+I_2)$), i.e., AF signal. As shown in this graph, the output ratio has substantially a linear relationship with respect to the reciprocal (1/L) of the distance L at a certain distance $L_4$ or less, such that the output ratio decreases as the distance L is longer (1/L is smaller). At the distance $L_4$ or greater, by contrast, the influence of the noise component increases as the distance L is greater. Letting $I_n$ ($I_n$ 0) be the noise component, the output ratio is $(I_1+I_n)/(I_1+I_n+I_2+I_n)$, whereby the output ratio would shift so as to increase (toward an output ratio of 50%) at the distance $L_4$ or greater. Also, since $I_n$ occurs randomly, it becomes unstable depending on the distance measuring condition. It is due to the fact that, as the distance L increases, the intensity of reflected light received by the PSD 116 decreases, whereby the noise component $I_n$ becomes relatively greater. If such a phenomenon occurs, the distance to the object L cannot be determined uniquely from the output ratio.

Therefore, as shown in FIG. 3, a clamping circuit 13 which outputs a clamp signal $I_c$ if the far-side signal $I_2$ outputted from the second signal processing circuit 120 is lower than the clamp signal $I_c$ is disposed between the second signal processing circuit 120 and the arithmetic circuit 132. Even in this case, however, as shown in FIG. 4 which will be explained later, the distance output is fixed at a certain constant distance on the far distance side, whereby the deviation from the designed value may become greater.

Hence, as a rangefinder apparatus overcoming such a problem, the following one has been known. FIG. 5 is a configurational view of the rangefinder apparatus in accordance with the second prior art. This drawings shows the light-receiving side alone. In the rangefinder apparatus shown in this drawing, the signals $I_1$ and $I_2$ outputted from a PSD 140, having their steady-state light components eliminated therefrom by their respective steady-state light eliminating circuits 142 and 144, are inputted to both of arithmetic circuits 146 and 148. According to the signals $I_1$ and $I_2$ with no steady-state light components, the arithmetic circuit 146 carries out an arithmetic operation of $I_1/(I_1+I_2)$, so as to determine the output ratio, and an integrating circuit 152 integrates this output ratio. On the other hand, an arithmetic circuit 148 carries out an arithmetic operation of $I_1+I_2$, so as to determine the quantity of light, and an integrating circuit 152 integrates this quantity of light. Then, a selecting unit 160 selects one of the output ratio and the quantity of light, and determines, based thereon, the distance to the object to be measured. Here, the selecting unit 160 is a processing operation in a CPU.

FIG. 6 is a configurational view of the rangefinder apparatus in accordance with the third prior art. This drawings shows the light-receiving side alone. In the rangefinder apparatus shown in this drawing, the signals $I_1$ and $I_2$ outputted from a PSD 170, having their steady-state light components eliminated therefrom by their respective steady-state light eliminating circuits 172 and 174, are inputted to one end of a switch 176. The switch 176 is controlled by a CPU, and inputs one of the outputs of the steady-state light eliminating circuits 172 and 174 to an integrating circuit 178. The integrating circuit 178 integrates one of the inputted signals $I_1$ and $I_2$, whereas an arithmetic unit 180 carries out an arithmetic operation of $I_1/(I_1+I_2)$ according to the result of integration, so as to determine the output ratio. On the other hand, an arithmetic unit 182 carries out an arithmetic operation of $I_1+I_2$, so as to determine the quantity of light. Then, a selecting unit 184 selects one of the output ratio and the quantity of light, and determines, based thereon, the distance to the object to be measured. Here, the arithmetic units 180, 182 and the selecting unit 184 are processing operations in the CPU.

In both of the rangefinder apparatus in accordance with the second and third prior art examples (FIGS. 5 and 6), the distance L to the object to be measured is determined according to the output ratio ($I_1/(I_1+I_2)$) and the light quantity ($I_1+I_2$) when the distance L is shorter and longer, respectively. Such a configuration makes it possible to uniquely determine the distance L.

SUMMARY OF THE INVENTION

As explained in the foregoing, both of the rangefinder apparatus in accordance with the second and third prior art examples (FIGS. 5 and 6) overcome the problem of the rangefinder apparatus in accordance with the first prior art (FIGS. 1 and 3). However, two sets of arithmetic circuits and two sets of integrating circuits are needed in the rangefinder apparatus in accordance with the second prior art (FIG. 5), which enhances its circuit size as compared with the rangefinder apparatus in accordance with the first prior art (FIGS. 1 and 3), thereby increasing its cost. On the other hand, though the circuit size is smaller in the rangefinder apparatus in accordance with the third prior art (FIG. 6), it cannot simultaneously detect both of the signals $I_1$ and $I_2$ from the PSD 170, whereby it will take twice as much time as that in the rangefinder apparatus in accordance with the second prior art (FIG. 5) if the distance L is to be determined with an S/N ratio on the same order as that in the latter.

Also, though each of the above-mentioned rangefinder apparatus in accordance with the prior art is designed such that it suitably operates when the reflectivity of the object to be measured (the object to be photographed) is at a standard value; if the reflectivity of the object is lower, the values of the signals $I_1$ and $I_2$ outputted from the PSD may become so low that an accurate distance measurement value cannot be obtained. This problem may be serious in particular when the distance to the object to be measured is long. This issue will be explained with reference to the results of calculation shown in FIGS. 4, 7, 8, and 9.

FIG. 4 is a graph showing the relationship between the distance signal obtained by the rangefinder apparatus in accordance with the first prior art and the distance when the reflectivity of the object to be measured is at a standard value, i.e., 36%. FIG. 7 is a graph showing the relationship between the distance signal obtained by the rangefinder apparatus in accordance with the first prior art and the distance when the reflectivity of the object is lower, i.e., 9%. FIG. 8 is a graph showing the relationship between the distance signal obtained by each of the rangefinder apparatus in accordance with the second and third prior art examples and the distance when the reflectivity of the object is at a standard value, i.e., 36%. FIG. 9 is a graph showing the relationship between the distance signal obtained by each of the rangefinder apparatus in accordance with the second and third prior art examples and the distance when the reflectivity of the object is lower, i.e., 9%. In each of the graphs, two broken lines parallel to each other represent the permissible range of errors in distance measurement.

In the rangefinder apparatus in accordance with the first prior art (FIG. 3), when the reflectivity of the object to be measured is at the standard value, i.e., 36%, as shown in FIG. 4, the distance signal always lies within the permissible range of errors in distance measurement, though barely at some distance values. On the other hand, when the reflectivity of the object to be measured is lower, i.e., 9%, as shown in FIG. 7, the distance signal may deviate from the permissible range of errors in distance measurement at some distance values. In each of the rangefinder apparatus in accordance with the second and third prior art examples, when the reflectivity of the object to be measured is at the standard value, i.e., 36%, as shown in FIG. 8, the distance signal always lies within the permissible range of errors in distance measurement, which is improved over that shown in FIG. 4. On the other hand, when the reflectivity of the object to be measured is lower, i.e., 9%, as shown in FIG. 9, the distance signal may deviate from the permissible range of errors in distance measurement at some distance values, as in the case with that shown in FIG. 7.

Thus, when the reflectivity of the object to be measured is lower, there are cases where, depending on the distance, the distance signal deviates from the permissible range of errors in distance measurement, thereby worsening the accuracy in distance measurement. For overcoming such a problem, in the rangefinder apparatus in accordance with the first prior art (FIG. 3), a clamping circuit which outputs the clamp signal $I_c$ if the far-side signal $I_2$ outputted from the second signal processing circuit 120 is lower than the clamp signal $I_c$ may be disposed between the second signal processing circuit 120 and the arithmetic circuit 132, while the level of the clamp signal $I_c$ is set low.

FIG. 10 is a graph showing the relationship between the distance signal obtained by the rangefinder apparatus in accordance with the first prior art and the distance when the reflectivity of the object to be measured is at a standard value, i.e., 36%, while the level of the clamp signal $I_c$ is set low. FIG. 11 is a graph showing the relationship between the distance signal obtained by the rangefinder apparatus in accordance with the first prior art and the distance when the reflectivity of the object is lower, i.e., 9%, while the level of the clamp signal $I_c$ is set low. As shown in FIG. 10, when the level of the clamp signal $I_c$ is loow and the reflectivity of the object is at the standard value, the distance signal always lies within the permissible range of errors in distance measurement, which is improved over that shown in FIG. 4 as well. On the other hand, as shown in FIG. 11, when the level of the clamp signal $I_c$ and the reflectivity of the object are low, the distance signal always lies within the permissible range of errors in distance measurement, though barely at some distance values.

However, if the level of the clamp signal $I_c$ is made low, there are further problems as follows when the external light luminance is relatively high. FIG. 12 is a graph showing the relationship between the distance signal obtained by the rangefinder apparatus in accordance with the first prior art and the distance when the external light luminance is high and the reflectivity of the object to be measured is at a standard value, i.e., 36%, while the level of the clamp signal $I_c$ is set low. FIG. 13 is a graph showing the relationship between the distance signal obtained by the rangefinder apparatus in accordance with the first prior art and the distance when the external light luminance is high and the reflectivity of the object is lower, i.e., 9%, while the level of the clamp signal $I_c$ is set low. As shown in these graphs, notwithstanding the fact that the permissible range of errors in distance measurement becomes wider when the external light luminance is higher, there are cases where the distance signal deviates from the permissible range of errors in distance measurement at some distance values whether the reflectivity of the object is at the standard value or lower than that, thereby worsening the accuracy in distance measurement. It is due to the fact that, when the external light luminance is high, the steady-state light elimination is not carried out sufficiently in each of the first signal processing circuit 118 and second signal processing circuit 120, whereby errors in distance measurement occur.

For overcoming the above-mentioned problems, the quantity of light projected from the IRED may be enhanced, or the diameter of the light-projecting lens or light-receiving lens may be increased. FIG. 14 is a graph showing the relationship between the distance signal obtained by the rangefinder apparatus in accordance with the first prior art and the distance when the quantity of light projected from the IRED is quadrupled and the reflectivity of the object to be measured is at a standard value, i.e., 36%. FIG. 15 is a graph showing the relationship between the distance signal obtained by the rangefinder apparatus in accordance with the first prior art and the distance when the quantity of light projected from the IRED is quadrupled and the reflectivity of the object is lower, i.e., 9%. As shown in these graphs, the distance signal always lies within the permissible range of errors in distance measurement whether the reflectivity of the object to be measured is at the standard value or lower than that. However, the cost increases when the quantity of light projected from the IRED is enhanced, whereas the size increases when the diameter of the light-projecting lens or light-receiving lens is enhanced.

For overcoming the above-mentioned problems, it is an object of the present invention to provide a rangefinder apparatus which can accurately determine the distance to an object to be measured even if the object has a low reflectivity and the distance to the object is long, without increasing its cost or size.

The rangefinder apparatus in accordance with the present invention comprises: (1) light-projecting means for projecting a luminous flux toward an object to be measured; (2) light-receiving means for receiving reflected light of the luminous flux projected to the object at a light-receiving position on a position sensitive detector corresponding to a distance to the object and outputting, according to the light-receiving position, a far-side signal having a greater value as the distance is longer if the quantity of received light is constant, and a near-side signal having a greater value as the distance is shorter if the quantity of received light is constant; (3) clamping means for inputting therein the far-side signal, comparing the level of the far-side signal with the level of a clamp signal in terms of magnitude, and outputting the far-side signal if the level of the far-side signal is at the level of the clamp signal or greater and outputting the clamp signal if not; (4) arithmetic means for calculating a ratio between the near-side signal and the signal outputted from the clamping means and outputting thus obtained output ratio signal; (5) integrating means for accumulating and integrating the output ratio signal and outputting an integrated signal corresponding to the result of integration; and (6) control means for controlling the projection of the luminous flux in the light-projecting means, the level of the clamp signal in the clamping means, and the sum of periods of accumulating operations of the output ratio signal in the integrating means, and detecting a distance measurement value according to the integrated signal outputted from the integrating means.

Also, the control means is characterized in that (1) it sets the clamp signal to a first level, sets the sum of periods of accumulating operations of the output ratio signal in the integrating means to a first number, and detects a first distance measurement value according to the integrated signal outputted from the integrating means; (2) when the first distance measurement value is greater than a first reference distance, it further sets the clamp signal to a second level which is lower than the first level, sets the sum of periods of accumulating operations of the output ratio signal in the integrating means to a second number, and detects a second distance measurement value according to the integrated signal outputted from the integrating means; and (3) when the first distance measurement value is greater than the second distance measurement value by not less than a predetermined value, it sets the clamp signal to the second level, sets the sum of periods of accumulating operations of the output ratio signal in the integrating means to a third number, detects a third distance measurement value according to the integrated signal outputted from the integrating means, and determines the distance to the object according to one or both of the second distance measurement value and the third distance measurement value.

This rangefinder apparatus operates as follows. The luminous flux outputted from the light-projecting means toward the object to be measured is reflected by the object, this reflected light is received by the light-receiving means at the light-receiving position on the position sensitive detector corresponding to the distance to the object, and the far-side signal having a greater value as the distance is longer if the quantity of the received light is constant and the near-side signal having a greater value as the distance is shorter if the quantity of the received light is constant are outputted according to the light-receiving position. The clamping means compares the far-side signal with the clamp signal in terms of magnitude of their levels. Then, the far-side signal is outputted if the level of the far-side signal is not lower than that of the clamp signal; otherwise, the clamp signal is outputted. The arithmetic means calculates the ratio between the near-side signal and the signal outputted from the clamping means, thereby outputting the output ratio signal. The integrating means accumulates and integrates the output ratio signal, thereby outputting the integrated signal corresponding to the result of integration. The control means controls these actions, and detects a distance measurement value according to the integrated signal outputted from the integrating means. More specifically, the rangefinder apparatus operates as follows. Here, the explanation will be made on condition that the distance measurement value becomes smaller as the distance is longer.

First, the clamp signal is set to the first level, the sum of periods of accumulating operations of the output ratio signal in the integrating means is set to the first number, and the first distance measurement value is detected according to the integrated signal outputted from the integrating means. If the first distance measurement value is greater than the first reference distance, then the clamp signal is further set to the second level that is lower than the first level, the sum of periods of accumulating operations of the output ratio signal in the integrating means is set to the second number, and the second distance measurement value is detected according to the integrated signal outputted from the integrating means. Here, the second number may be either identical to or different from the first number.

When the first distance measurement value is greater than the second distance measurement value by not less than a predetermined value, the clamp signal is set to the second level, the sum of periods of accumulating operations of the output ratio signal in the integrating means is set to the third number, the third distance measurement value is detected according to the integrated signal outputted from the integrating means, and the distance to the object is determined according to the third distance measurement value. Alternatively, according to the already detected second distance measurement value or according to both of the second and third distance measurement values, the distance to the object is determined. Namely, in this case, it is determined that the reflectivity of the object is low and the distance to the object is long. Hence, as the distance measurement is carried out with the level of the clamp signal being set low, the distance can be determined accurately.

Also, with the clamp signal being set to the third level that is lower than the second level, and the sum of periods of accumulating operations of the output ratio signal in the integrating means being set to a predetermined number, a distance measurement value may be detected according to the integrated signal outputted from the integrating means, and when the difference obtained by subtracting the second distance measurement value from thus obtained distance measurement value is greater than a predetermined value, the distance to the object may be determined according to this distance measurement value. Similarly, the clamp signal may be set to a fourth level which is further lower. Thus, since individual distance measurement values are determined with clamp signals being set to a plurality of levels, respectively, and differences among the individual distance measurement values are determined, the reflectivity of the object can be determined in a plurality of stages, whereby the distance to the object can be determined further accurately.

Also, the rangefinder apparatus in accordance with the present invention may further comprise luminance measuring means for measuring the external light luminance. When the external light luminance measured by the luminance measuring means is lower than a predetermined luminance value, (1) the control means sets the clamp signal to a first level, sets the sum of periods of accumulating operations of the output ratio signal in the integrating means to a first number, and detects a first distance measurement value according to the integrated signal outputted from the integrating means; (2) when the first distance measurement value is greater than a first reference distance, the control means sets the clamp signal to a second level which is different from the first level, sets the sum of periods of accumulating operations of the output ratio signal in the integrating means to a second number, and detects a second distance measurement value according to the integrated signal outputted from the integrating means; and (3) when one of the first and second distance measurement values whose clamp signal is at a higher level is greater by not less than a predetermined value than that of the other distance measurement value whose clamp signal is at a lower level, the control means sets the clamp signal to the lower level, sets the sum of periods of accumulating operations of the output ratio signal in the integrating means to a third number, detects a third distance measurement value, and determines the distance to the object according to one or both of the third distance measurement value and the distance measurement value obtained when the clamp signal is at the lower level. On the other hand, when the external light luminance measured by the luminance measuring means is at the predetermined luminance value or higher, the clamp signal is set to the higher level, the sum of periods of accumulating operations of the output ratio signal in the integrating means is set to a predetermined number, a distance measurement value is detected according to the integrated signal outputted from the integrating means, and the distance to the object is determined according to this distance measurement value.

In this case, while effects substantially similar to those mentioned above are obtained when the external light luminance measured by the luminance measuring means is lower than the predetermined luminance value, it does not matter whether the first level is higher or lower than the second level. On the other hand, when the external light luminance measured by the luminance measuring means is at the predetermined luminance value or higher, regardless of the reflectivity of the object or the distance thereto, the clamp signal is set to the higher level, and the distance measurement is carried out with the sum of periods of accumulating operations of the output ratio signal in the integrating means being set to the predetermined number, whereby the distance to the object can be determined accurately.

The control means of the rangefinder apparatus in accordance with the present invention may be characterized in that, when the difference between the first distance measurement value and the second distance measurement value is not greater than a predetermined value, it sets the clamp signal to the first level, sets the sum of periods of accumulating operations of the output ratio signal in the integrating means to a fourth number, detects a fourth distance measurement value according to the integrated signal outputted from the integrating means, and determines the distance to the object according to one or both of the first distance measurement value and the fourth distance measurement value. In this case, when the above-mentioned difference is not greater than the predetermined value, the clamp signal is set to the first level, the sum of periods of accumulating operations of the output ratio signal in the integrating means is set to the fourth number, the fourth distance measurement value is detected according to the integrated signal outputted from the integrating means, and the distance to the object is determined according to the fourth distance measurement value. Alternatively, according to the already detected first distance measurement value, or according to both of the first distance measurement value and fourth distance measurement value, the distance to the object is determined. Namely, in this case, while it is determined that the distance to the object is long, it is determined that the reflectivity of the object is relatively high, whereby the distance can be determined accurately when the distance measurement is carried out with the clamp signal being set to a normal value.

The control means of the rangefinder apparatus in accordance with the present invention may be characterized in that, when the first distance measurement value is greater than a second reference distance but not greater than the first reference distance, it sets the clamp signal to the first level, sets the sum of periods of accumulating operations of the output ratio signal in the integrating means to a fifth number, detects a fifth distance measurement value according to the integrated signal outputted from the integrating means, and determines the distance to the object according to the fifth distance measurement value. In this case, it is determined that the distance to the object is in a medium range. As a consequence, regardless of the reflectivity of the object, the distance measurement is carried out with the clamp signal being set to the normal first level even when the sum of periods of accumulating operations is smaller than a normal predetermined number, whereby the distance can be determined accurately. Also, as the sum of periods of accumulating operations upon detecting the fifth distance measurement value is made smaller, the total time required for distance measurement can be shortened.

The control means of the rangefinder apparatus in accordance with the present invention may be characterized in that, when the first distance measurement value is not greater than the second distance measurement value, it determines the distance to the object according to the first distance measurement value. Namely, in this case, the distance to the object is determined according to the first distance measurement value detected with the clamp signal having the normal value. In this case, it is determined that the distance to the object is short. As a consequence, regardless of the reflectivity of the object, the distance measurement is carried out with the clamp signal being set to the normal value even when the sum of periods of accumulating operations is smaller than the normal predetermined number, whereby the distance can be determined accurately. Also, since the sum of periods of accumulating operations can be made smaller than the normal predetermined number, the total time required for the distance measurement can be shortened.

The control means of the rangefinder apparatus in accordance with the present invention may be characterized in that, when the above-mentioned difference is greater than a predetermined value, it obtains a weighted average of the second distance measurement value and the third distance measurement value according to the second number and the third number, so as to determine the distance to the object. Also, the control means of the rangefinder apparatus in accordance with the present invention may be characterized in that, when the above-mentioned difference is not greater than the predetermined value, it obtains a weighted average of the first distance measurement value and the fourth distance measurement value according to the first number and the fourth number, so as to determine the distance to the object. Also, the control means of the rangefinder apparatus in accordance with the present invention may be characterized in that it obtains a weighted average of the first distance measurement value and the fifth distance measurement value according to the first number and the fifth number, so as to determine the distance to the object. In each of these cases, each of the first number, which is the sum of periods of accumulating operations when detecting the first distance measurement value, and the second number, which is the sum of periods of accumulating operations when detecting the second distance measurement value, is made smaller, so that the time required for determining whether the reflectivity is high or low and the distance is long or short can be shortened, and as the distance is determined according to the first or second distance measurement value, the total time required for the distance measurement can be shortened, whereby the accuracy in distance measurement can be improved.

Also, the control means of the rangefinder apparatus in accordance with the present invention may be characterized in that (1) it sets the clamp signal to a plurality of levels, and detects a plurality of distance measurement values according to respective integrated signals outputted from the integrating means with respect to the plurality of levels; (2) when the plurality of distance measurement values include those obtained with the clamp signal being set to the highest level which are greater by not less than a predetermined value than the distance measurement value obtained with the clamp signal being set to a lower level, it employs the distance measurement value detected with respect to the clamp signal having the lowest level among the greater distance measurement values as a first distance measurement value, and employs the sum of periods of accumulating operations of the output ratio signal in the integrating means as a first number; and (3) it sets the clamp signal to the lowest level, sets the sum of periods of accumulating operations of the output ratio signal in the integrating means to a second number, detects a second distance measurement value according to the integrated signal outputted from the integrating means, and determines the distance to the object according to one of or both of the first distance measurement value and second distance measurement value.

First, in this case, the clamp signal is set to a plurality of levels, and a plurality of distance measurement values are detected according to respective integrated signals outputted from the integrating means with respect to the plurality of levels, whereas their order is arbitrary. When the plurality of distance measurement values include those obtained with the clamp signal being set to the highest level which are greater by not less than a predetermined value than the distance measurement value obtained with the clamp signal being set to the lower level, the control means operates as follows. Namely, the distance measurement value detected with respect to the clamp signal having the lowest level among the greater distance measurement values is employed as the first distance measurement value. The sum of periods of accumulating operations of the output ratio signal in the integrating means thereupon is employed as the first number. Then, the clamp signal is set to the lowest level, the sum of the periods of accumulating operations of the output ratio signal is set to the second number, the second distance measurement value is detected according to the integrated signal outputted from the integrating means, and the distance to the object is determined according to one or both of the first distance measurement value and the second distance measurement value.

Also, when the plurality of distance measurement values do not include those obtained with the clamp signal being set to the highest level which are greater by the predetermined value than the distance measurement value obtained with the clamp signal being set to the lower level, the control means operates as follows. Namely, the distance measurement value detected with respect to the clamp signal having the highest level is employed as a third distance measurement value. The sum of periods of accumulating operations of the output ratio signal in the integrating means thereupon is employed as a third number. Then, the clamp signal is set to the highest level, the sum of the periods of accumulating operations of the output ratio signal is set to a fourth number, a fourth distance measurement value is detected according to the integrated signal outputted from the integrating means, and the distance to the object is determined according to one or both of the third distance measurement value and the fourth distance measurement value.

The control means may be characterized in that it obtains a weighted average of the first distance measurement value and the second distance measurement value according to the first number and the second number, so as to determine the distance to the object. The control means may be characterized in that it obtains a weighted average of the third distance measurement value and the fourth distance measurement value according to the third number and the fourth number, so as to determine the distance to the object. In each of these cases, each of the first number, which is the sum of periods of accumulating operations when detecting the first distance measurement value, and the second number, which is the sum of periods of accumulating operations when detecting the second distance measurement value, is made smaller, so that the time required for determining whether the reflectivity is high or low and the distance is long or short can be shortened, and as the distance is determined according to the first or second distance measurement value, the total time required for the distance measurement can be shortened, whereby the accuracy in distance measurement can be improved.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 22 is a flowchart for explaining operations of the rangefinder apparatus in accordance with the first embodiment;

FIG. 33 is a flowchart for explaining operations of the rangefinder apparatus in accordance with a second embodiment.

DESCRIPTION OF THE PREFERRED EMBODIMENTS

In the following, embodiments of the present invention will be explained in detail with reference to the accompanying drawings. Here, in the explanation of the drawings, constituents identical to each other will be referred to with letters or numerals identical to each other, without their overlapping descriptions being repeated. Also, the following explanation relates to a case where active type rangefinder apparatus in accordance with these embodiments are employed as a rangefinder apparatus of an autofocus type camera.

First Embodiment

Figure 16:
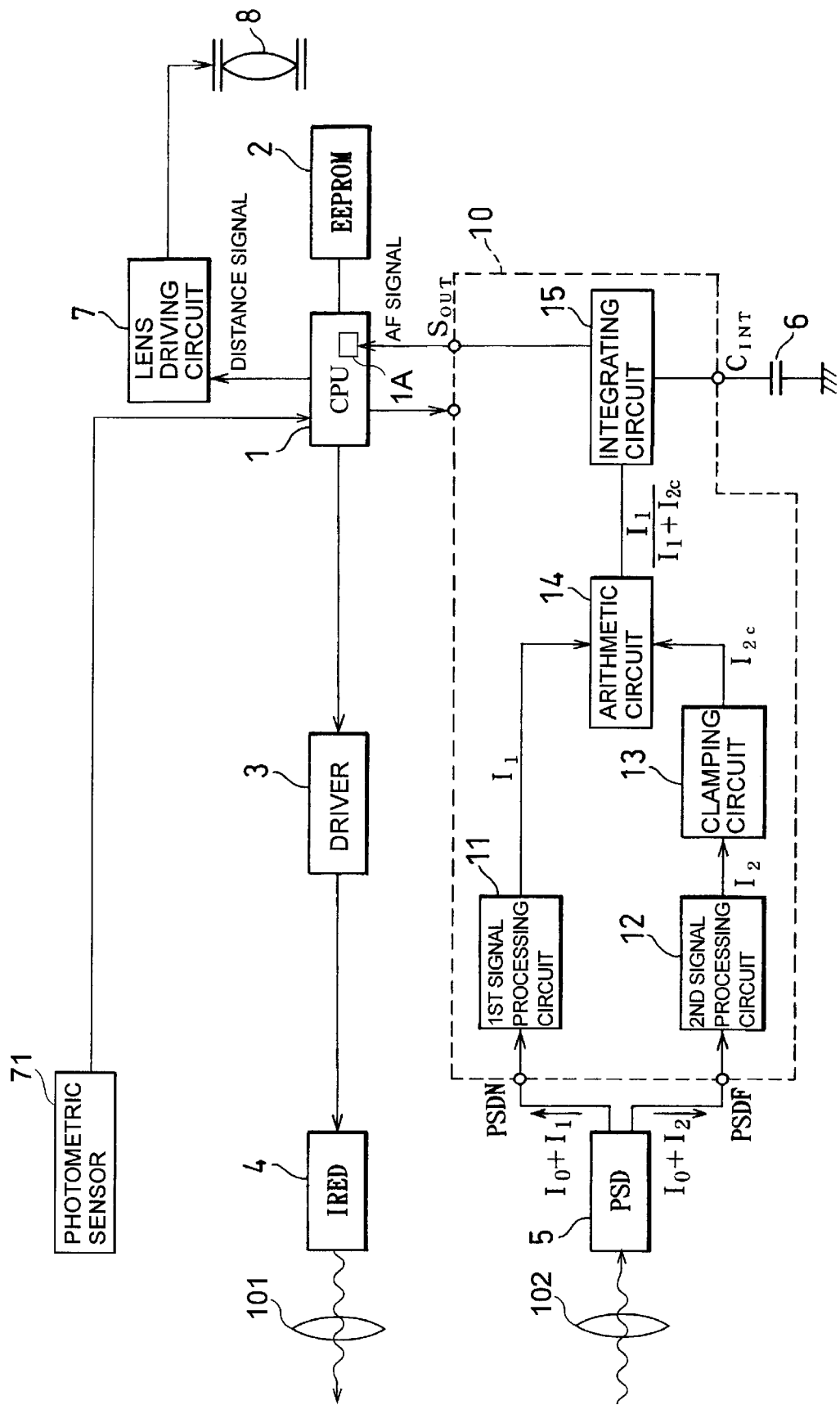
FIG. 16 is a configurational view of the rangefinder apparatus in accordance with a first embodiment of the present invention.

To begin with, the overall configuration of the rangefinder apparatus in accordance with the first embodiment will be explained. FIG. 16 is a configurational view of the rangefinder apparatus in accordance with this embodiment.

A CPU 1 is used for controlling the whole camera equipped with this rangefinder apparatus, and controls the whole camera including the rangefinder apparatus according to a program and parameters prestored in an electrically erasable and programmable read-only memory (EEPROM) 2. In the rangefinder apparatus shown in this drawing, the CPU 1 regulates a driver 3, so as to control the emission of infrared light from an IRED (infrared light-emitting diode) 4. Also, the CPU 1 controls actions of an autofocus IC (AFIC) 10, and inputs the AF signal outputted from the AFIC 10. Further, the CPU 1 inputs the value of external light luminance measured by a photometric sensor 71.

In particular, the CPU 1 in accordance with this embodiment is characterized in that it comprises a control unit 1A. The control unit 1A controls the level of the clamp signal in a clamping circuit 13 and the sum of periods of accumulating operations of the output ratio signal in an integrating circuit 15, and detects a distance measurement value according to an integrated signal outputted from the integrating circuit 15. According to this distance measurement value, the control unit 1A carries out various comparisons, arithmetic operations, control operations, and the like, thereby determining an accurate distance measurement value.

By way of a light-projecting lens 101 disposed at the front face of the IRED 4, the infrared light emitted from the IRED 4 is projected onto the object to be measured. The infrared light is partly reflected by the object, and the resulting reflected light is received, by way of a light-receiving lens 102 disposed at the front face of a PSD (position sensitive detector) 5, at a position on the light-receiving surface of the PSD 5. This light-receiving position corresponds to the distance to the object. Then, the PSD 5 outputs two signals $I_1$ and $I_2$ which correspond to the light-receiving position. The signal $I_1$ is a near-side signal which has a greater value as the distance is shorter if the quantity of received light is constant, whereas the signal $I_2$ is a far-side signal which has a greater value as the distance is longer if the quantity of received light is constant. The sum of the signals $I_1$ and $I_2$ represents the quantity of reflected light received by the PSD 5, whereas the output ratio ($I_1/(I_1+I_2)$) represents the light-receiving position on the light-receiving surface of the PSD 5, i.e., the distance to the object. The near-side signal $I_1$ is inputted to the PSDN terminal of the AFIC 10, whereas the far-side signal $I_2$ is inputted to the PSDF terminal of the AFIC 10. In practice, however, depending on external conditions, there are cases where respective signals in which a steady-state light component $I_0$ is added to the near-side signal $I_1$ and far-side signal $I_2$ are fed into the AFIC 10.

The AFIC 10 is an integrated circuit (IC) constituted by a first signal processing circuit 11, a second signal processing circuit 12, the clamping circuit 13, an arithmetic circuit 14, and the integrating circuit 15. The first signal processing circuit 11 inputs therein a signal $I_1+I_0$ outputted from the PSD 5, and eliminates the steady-state light component $I_0$ therefrom, thereby outputting the near-side signal $I_1$; whereas the second signal processing circuit 12 inputs therein a signal $I_2+I_0$ outputted from the PSD 5, and eliminates the steady-state light component $I_0$ therefrom, thereby outputting the far-side signal $I_2$.

The clamping circuit 13 inputs therein the far-side signal $I_2$ outputted from the second signal processing circuit 12, compares a clamp signal $I_c$ having a certain level and the far-side signal $I_2$ in terms of the magnitude of their levels. If the former is greater than the latter, then the clamp signal $I_c$ is outputted; otherwise, the far-side signal $I_2$ is outputted as it is. In the following, the signal outputted from the clamping circuit 13 is represented by $I_{2c}$.

The arithmetic circuit 14 inputs therein the near-side signal $I_1$ outputted from the first signal processing circuit 11 and the signal $I_{2c}$ (the signal having a greater value in the far-side signal $I_2$ and the clamp signal $I_c$) outputted from the clamping circuit 13, calculates an output ratio ($I_1/(I_1+I_{2c})$) and outputs an output ratio signal representing the result thereof. The integrating circuit 15 inputs therein the output ratio signal and, together with an integrating capacitor 6 connected to the $C_{INT}$ terminal of the AFIC 10, accumulates the output ratio a plurality of times, thereby improving the S/N ratio. In particular, it is important that the number of accumulating operations when the distance to the object is longer be made greater than that when the distance is shorter, so as to improve the S/N ratio. Thus accumulated output ratio is outputted from the $S_{OUT}$ terminal of the AFIC 10 as the AF signal. The CPU 1 inputs therein the AF signal outputted from the AFIC 10, converts the AF signal into a distance signal by carrying out a predetermined arithmetic operation, and sends out the resulting distance signal to a lens driving circuit 7. According to this distance signal, the lens driving circuit 7 causes a taking lens 8 to effect a focusing action.

Figure 17:
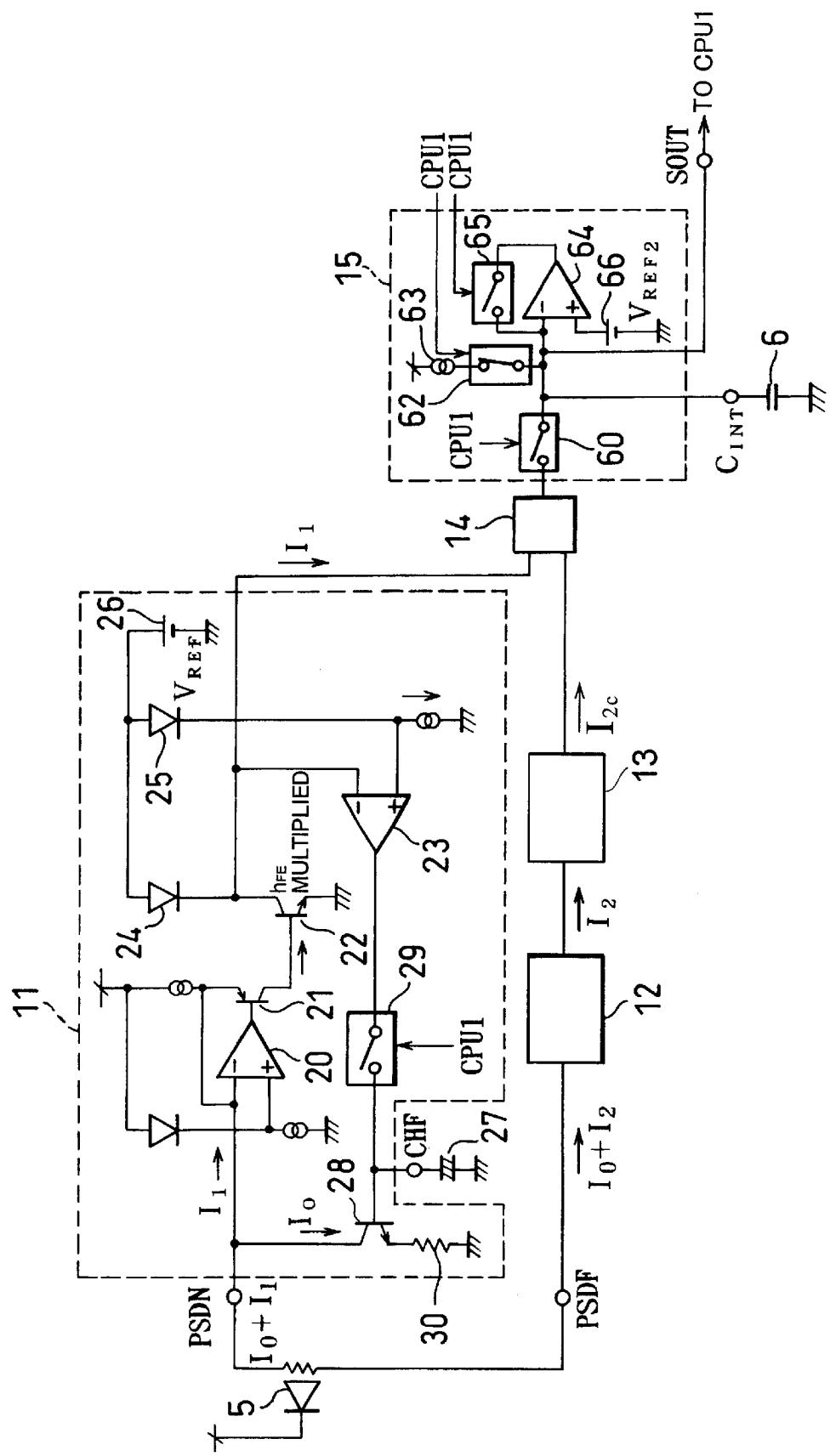
FIG. 17 is a circuit diagram of the first signal processing circuit and integrating circuit in the rangefinder apparatus in accordance with the first embodiment.
Figure 18:
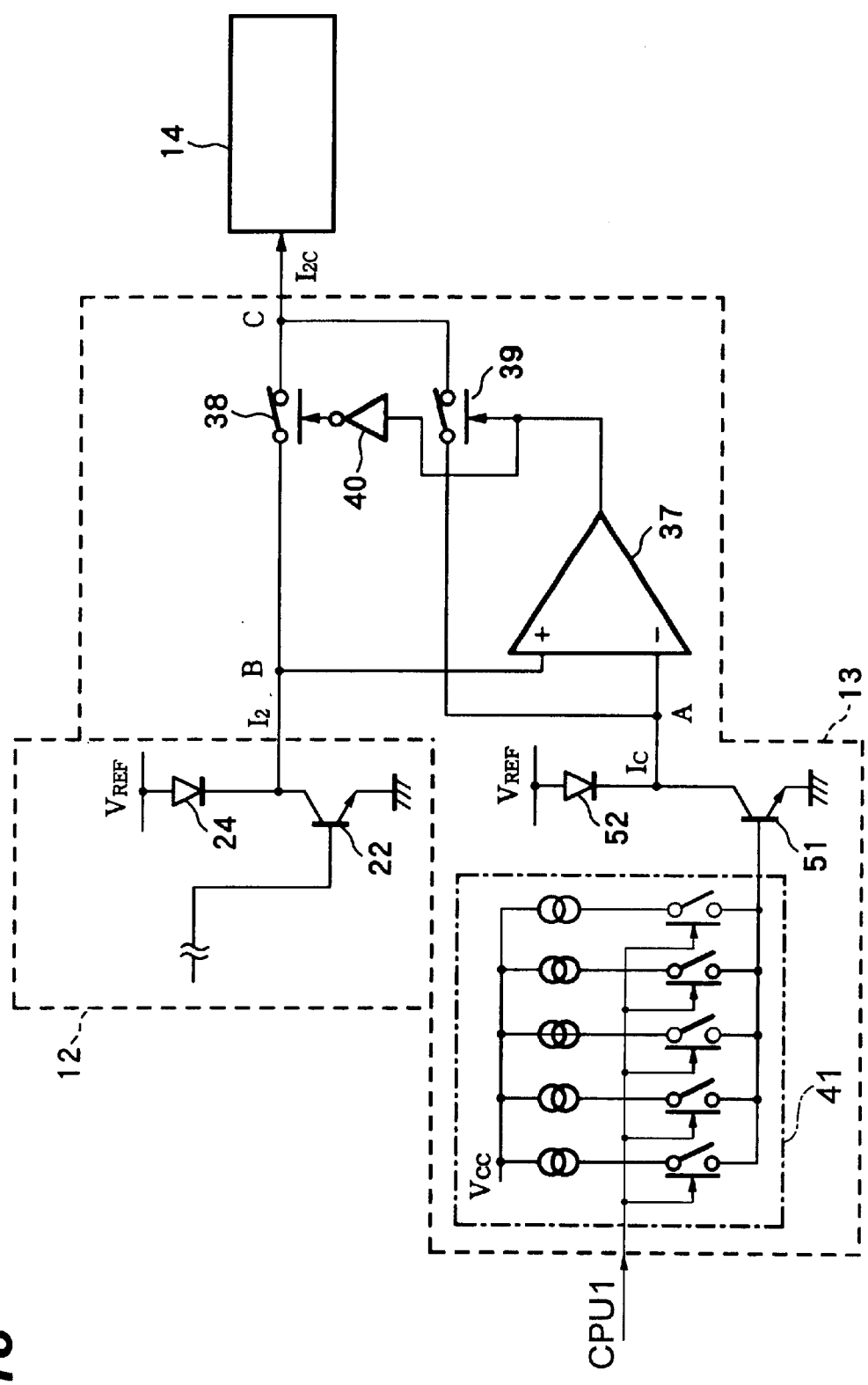
FIG. 18 is a circuit diagram of the clamping circuit in the rangefinder apparatus in accordance with the first embodiment.

More specific respective circuit configurations of the first signal processing circuit 11, clamping circuit 13, and integrating circuit 15 in the AFIC 10 will now be explained. FIG. 17 is a circuit diagram of the first signal processing circuit 11 and integrating circuit 15 in the rangefinder apparatus in accordance with this embodiment. FIG. 18 is a circuit diagram of the clamping circuit 13 in the rangefinder apparatus in accordance with this embodiment. Here, the second signal processing circuit 12 has a circuit configuration similar to that of the first signal processing circuit 11.

The first signal processing circuit 11, whose circuit diagram is shown in FIG. 17, inputs therein the near-side signal $I_1$ with the steady-state light component $I_0$ outputted from the PSD 5, eliminates the steady-state light component $I_0$, and outputs the near-side signal $I_1$. The current ($I_1+I_0$) outputted from the near-distance-side terminal of the PSD 5 is fed to the "−" input terminal of an operational amplifier 20 in the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compression diode 24 is connected to the collector terminal of the transistor 22, whereas the cathode terminal of a compression diode 25 is connected to the "+" input terminal of the operational amplifier 23. A first reference power source 26 is connected to the respective anode terminals of the compression diodes 24 and 25.

Also, a steady-state light eliminating capacitor 27 is externally attached to the CHF terminal of the AFIC 10, and is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of the steady-state light eliminating transistor 28 is connected to the "−" input terminal of the operational amplifier 20, whereas the emitter terminal of the transistor 28 is grounded by way of a resistor 30.

The circuit diagram of the clamping circuit 13 is shown in FIG. 18. The "+" input terminal of a determination comparator 37 in the clamping circuit 13 is connected to the collector terminal of the transistor 22 in the second signal processing circuit 12, and to the input terminal of the arithmetic circuit 14 byway of a switch 38. On the other hand, the "−" input terminal of the determination comparator 37 is connected to the collector terminal of a transistor 51 and the cathode terminal of a compression diode 52, as with the transistor 22 and compression diode 24 connected to the "+" input terminal thereof, and is also connected to the input terminal of the arithmetic circuit 14 by way of a switch 39.

Also, a clamp current source 41 is connected to the base terminal of the transistor 51. In this clamp current source 41, a plurality of sets of constant current sources and switches, each comprising a constant current source and a switch connected in series, are connected in parallel, and each switch is adapted to open and close under the control of the CPU 1. The clamp current source 41 inputs a clamp current, which is the sum of the currents from the respective constant current sources corresponding to the closed switches, to the base terminal of the transistor 51. This clamp current becomes the base current of the transistor 51, and the collector potential corresponding to the magnitude thereof is fed to the "−" input terminal of the determination comparator 37.

The output terminal of the determination comparator 37 is connected to the switch 39, whereby the output signal of the former is inputted to the latter. Also, the output terminal of the determination comparator 37 is connected to the switch 38 by way of an inverter 40, whereby the output signal of the determination comparator 37 is inputted to the switch 38 after being inverted. Hence, the switches 38 and 39 have such a relationship therebetween that, if one of them is turned ON by the output signal from the determination comparator 37, the other is turned OFF.

The circuit configuration of the integrating circuit 15 is shown in FIG. 17. The integrating capacitor 6 externally attached to the $C_{INT}$ terminal of the AFIC 10 is connected to the output terminal of the arithmetic circuit 14 by way of a switch 60, to a constant current source 63 by way of a switch 62, to the output terminal of an operational amplifier 64 by way of a switch 65, and directly to the "−" input terminal of the operational amplifier 64, whereas the potential thereof is outputted from the $S_{OUT}$ terminal of the AFIC 10. The switches 60, 62, and 65 are controlled by control signals from the CPU 1. Also, a second reference power source 66 is connected to the "+" input terminal of the operational amplifier 64.

The outline of operations of thus configured AFIC 10 will now be explained with reference to FIGS. 17 and 18. When not causing the IRED 4 to emit light, the CPU 1 keeps the switch 29 of the first signal processing circuit 11 in its ON state. The steady-state light component $I_0$ outputted from the PSD 5 at this time is inputted to the first signal processing circuit 11, and is amplified as a current by the current amplifier constituted by the operational amplifier 20 and the transistors 21 and 22. Thus amplified signal is logarithmically compressed by the compression diode 24, so as to be converted into a voltage signal, which is then fed to the "−" input terminal of the operational amplifier 23. When the signal inputted to the operational amplifier 20 is higher, the cathode potential of the compression diode 24 becomes higher, thus increasing the signal outputted from the operational amplifier 23, whereby the capacitor 27 is charged. As a consequence, a base current is supplied to the transistor 28, so that a collector current flows into the transistor 28, whereby, of the signal $I_0$ fed into the first signal processing circuit 11, the signal inputted to the operational amplifier 20 decreases. In the state where the operation of this closed loop is stable, all of the signal $I_0$ inputted to the first signal processing circuit 11 flows into the transistor 28, whereby the charge corresponding to the base current at this time is stored in the capacitor 27.

When the CPU 1 turns OFF the switch 29 while causing the IRED 4 to emit light, of the signal $I_1+I_0$ outputted from the PSD 5 at this time, the steady-state light component $I_0$ flows as the collector current into the transistor 28 to which the base potential is applied by the charge stored in the capacitor 27, whereas the near-side signal $I_1$ is amplified as a current by the current amplifier constituted by the operational amplifier 20 and the transistors 21 and 22 and then is logarithmically compressed by the compression diode 24, so as to be converted into and outputted as a voltage signal. Namely, from the first signal processing circuit 11, the near-side signal $I_1$ is outputted alone after the steady-state light component $I_0$ is eliminated, and thus outputted near-side signal $I_1$ is inputted to the arithmetic circuit 14. From the second signal processing circuit 12, on the other hand, as with the first signal processing circuit 11, the far-side signal $I_2$ is outputted alone after the steady-state light component $I_0$ is eliminated, and thus outputted far-side signal $I_2$ is inputted to the clamping circuit 13.

The far-side signal $I_2$ inputted to the clamping circuit 13 is fed to the "+" input terminal of the determination comparator 37 in the clamping circuit 13. The clamp current outputted from the clamp current source 41 flows as a base current into the transistor 51, and its accompanying potential (clamp current $I_c$) at the collector terminal of the transistor 51 is inputted to the "−" input terminal of the determination comparator 37. The far-side signal $I_2$ and the clamp signal $I_c$ are compared with each other in terms of magnitude by the determination comparator 37. According to the result thereof, one of the switches 38 and 39 is turned ON, whereas the other is turned OFF. Namely, if the far-side signal $I_2$ is greater than the clamp signal $I_c$, then the switch 38 is turned ON, whereas the switch 39 is turned OFF, whereby the far-side signal $I_2$ is outputted as the output signal $I_{2c}$ of the clamping circuit 13. If their relationship in terms of magnitude is reversed, then the switch 38 is turned OFF, whereas the switch 39 is turned ON, whereby the clamp signal $I_c$ is outputted as the output signal $I_{2c}$ of the clamping circuit 13.

The signal $I_{2c}$ outputted from the clamping circuit 13 and the near-side signal $I_1$ outputted from the first signal processing circuit 11 are inputted to the arithmetic circuit 14, and the output ratio $(I_1/(I_1+I_{2c}))$ is calculated by the arithmetic circuit 14 and is outputted to the integrating circuit 15. While the IRED 4 is emitting a predetermined number of pulses of light, the switch 60 of the integrating circuit 15 is kept in its ON state, whereas the switches 62 and 65 are turned OFF, whereby the voltage value of the integrating capacitor 6 is gradually reduced from $V_{ref2}$ due to the discharge corresponding to each of the output ratio signals outputted from the arithmetic circuit 14 (first integration). When a predetermined number of pulse light emissions are completed, then the switch 60 is turned OFF, whereas the switch 62 is turned ON, whereby the voltage value of the integrating capacitor 6 reduced by the first integration is increased by the charge supplied from the constant current source 63 (second integration). The CPU 1 monitors the potential of the integrating capacitor 6, so as to measure the time required for regaining the original potential, and determines the AF signal according to thus measured time, thereby determining the distance to the object.

Figure 19:
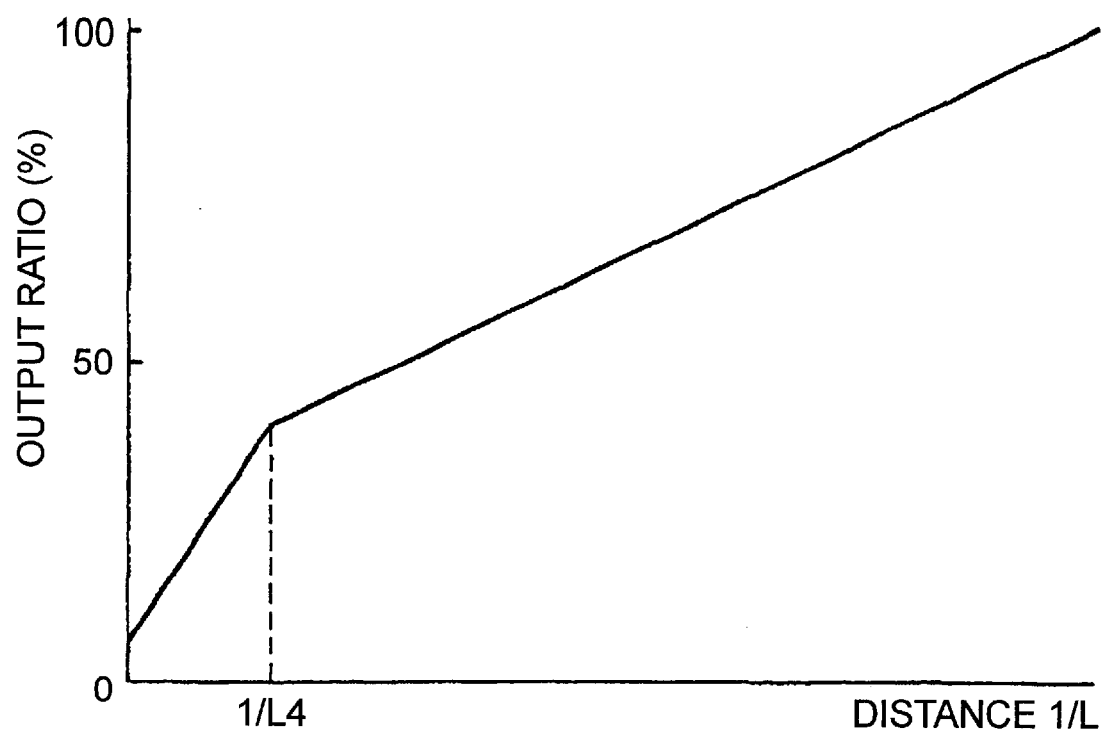
FIG. 19 is a graph showing the relationship between the AF signal outputted from the integrating circuit in the rangefinder apparatus in accordance with the first embodiment and the distance to the object to be measured.

FIG. 19 shows the relationship between thus obtained AF signal and the distance L to the object to be measured. Namely, FIG. 19 is a graph showing the relationship between the AF signal outputted from the integrating circuit of the rangefinder apparatus in accordance with this embodiment and the distance to the object to be measured. In this graph, the abscissa indicates the reciprocal (1/L) of the distance L to the object, whereas the ordinate indicates the output ratio $(I_1/(I_1+I_2))$ i.e., AF signal. As shown in this graph, at a certain distance $L_4$ or less (L $L_4$), the signal outputted from the clamping circuit 13 is $I_2$, the output ratio is $I_1/(I_1+I_2)$, and the output ratio has substantially a linear relationship with respect to the reciprocal (1/L) of the distance L, such that the output ratio decreases as the distance L is longer (1/L is smaller). At the distance $L_4$ or greater (L $L_4$), on the other hand, the signal outputted from the clamping circuit 13 is $I_c$, the output ratio is $I_1/(I_1+I_c)$, and the output ratio decreases as the distance L is longer in this case as well. Thus, when the clamping circuit 13 is used, the distance L to the object can be determined uniquely and reliably from the output ratio (AF signal).

Figure 20:
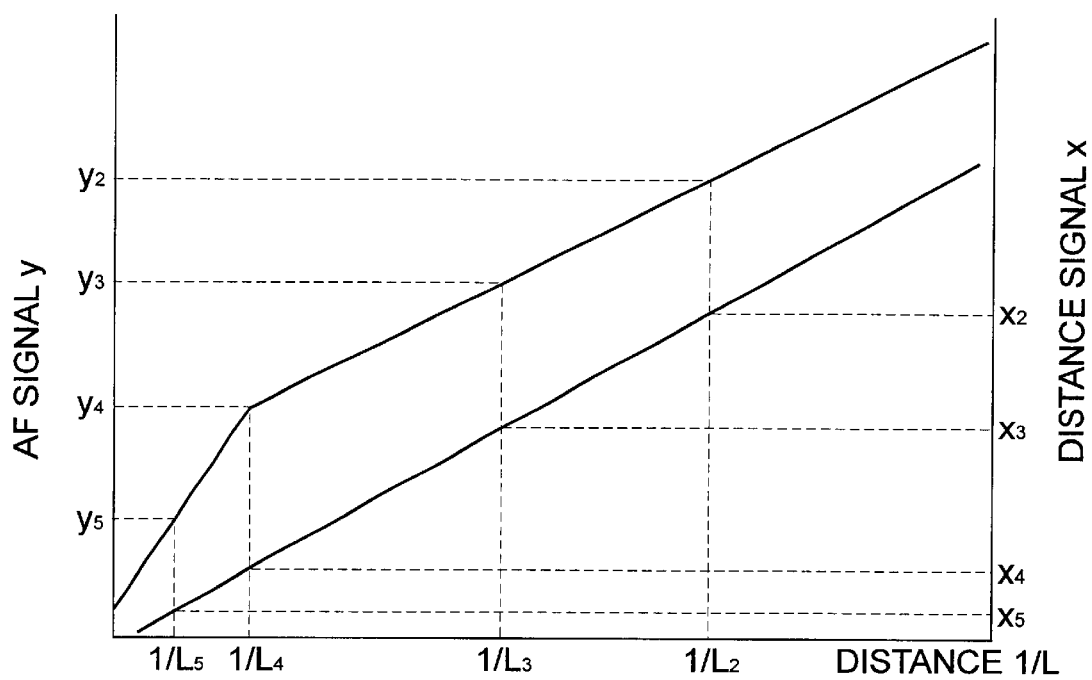
FIG. 20 is an explanatory view of the conversion from the AF signal to the distance signal in the rangefinder apparatus in accordance with the first embodiment.

According to thus obtained AF signal, the CPU determines a distance signal representing the amount of extension of the taking lens 8 by an arithmetic operation, and sends out this distance signal to the lens driving circuit 7, so as to cause the taking lens 8 to effect a focusing action. FIG. 20 is an explanatory view of the conversion from the AF signal to the distance signal in the rangefinder apparatus in accordance with this embodiment. In this graph, the abscissa indicates the reciprocal (1/L) of the distance L to the object to be measured, the left ordinate indicates the AF signal, and the right ordinate indicates the distance signal. Also, this graph indicates the relationship between the distance L and the AF signal, and the relationship between the distance L and the distance signal. In particular, it indicates that, for the distances $L_2$, $L_3$, $L_4$, and $L_5$ (where $L_2<L_3<L_4<L_5$), the AF signals are $Y_2$, $Y_3$, $Y_4$, and $Y_5$, and the distance signals are $X_2$, $x_3$, $x_4$, and $x_5$, respectively.

Here, in each of the ranges where the distance L $L_4$ and L>$L_4$, the AF signal has substantially a linear relationship with respect to the reciprocal (1/L) of the distance L; whereas the distance signal has substantially a linear relationship with respect to the reciprocal (1/L) of the distance L over the whole range of the distance L. Also, in each of the ranges where the distance L<$L_4$ and L $L_4$, the AF signal and the distance signal have substantially a linear relationship therebetween.

Therefore, the AF signal y can be converted into the distance signal x by use of a converting expression represented by a linear expression. Namely, within the range where the AF signal y is beyond the clamping effect determination reference level (within the range where the distance L is less than $L_4$), according to the following parameters:

$$A_2=(x_3-x_2)/(y_3-y_2) \tag{1a}$$

$$B_2=x_2-Y_2 \cdot A_2 \tag{1b}$$

the distance signal x is determined from the following converting expression:

$$x=A_2 \cdot y+B_2 \tag{2}$$

On the other hand, within the range where the AF signal y is not greater than the clamping effect determination reference level (within the range where the distance L is $L_4$ or greater), according to the following parameters:

$$A_3=(x_5-X_4)/(y_5-Y_4) \tag{3a}$$

$$B_3=X_4-y_4 \cdot A_3 \tag{3b}$$

the distance signal x is determined from the following converting expression:

$$x=A_3 \cdot y+B_3 \tag{4}$$

Here, the above-mentioned expressions (2) and (4) are converting expressions different from each other. Further, when the AF signal y is not greater than the farthest AF signal value INFDATA corresponding to the farthest setting value of the taking lens 8, setting the distance signal x to the farthest distance signal value AFINF corresponding to the farthest setting value of the taking lens 8 enables further stable focusing control of the taking lens. Here, the parameters $A_2$, $B_2 A_3$, and $B_3$, the farthest AF signal value INFDATA, and the farthest distance signal value AFINF are determined for each camera in which this rangefinder apparatus is incorporated, at the manufacture thereof, and is prestored in the EEPROM 2 or the like. These parameters are read out by the CPU 1 at the time of distance measurement, and the arithmetic operation of expression (2) or (3) is carried out, whereby the AF signal y is converted into the distance signal x.

Figure 21A:
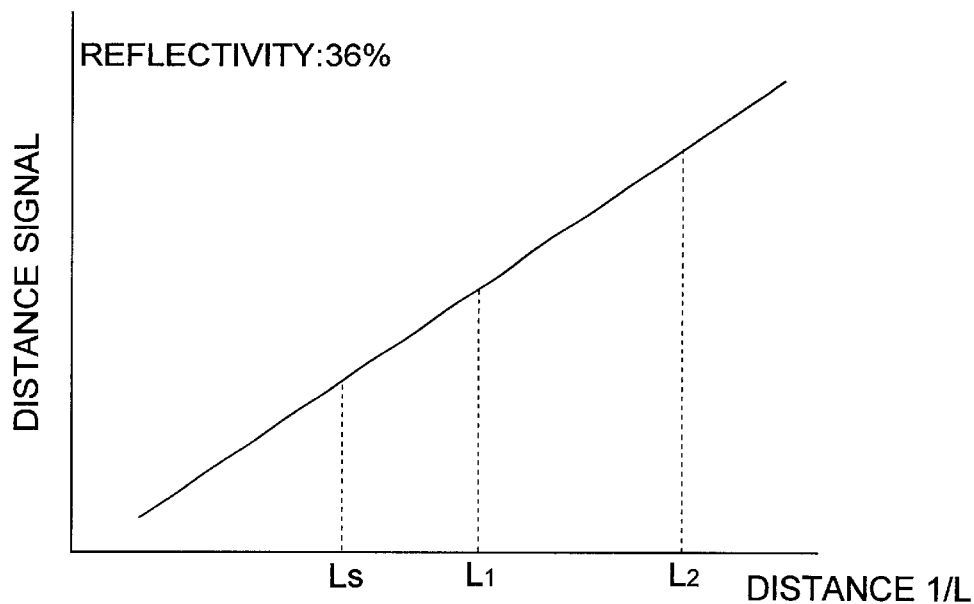
FIGS. 21A and 21B are graphs for explaining the respective relationships between the distance to the object to be measured and the distance signal in the cases where the reflectivity of the object is at a standard value, i.e., 36%, and at a lower reflectivity, i.e., 9%.
Figure 21B:
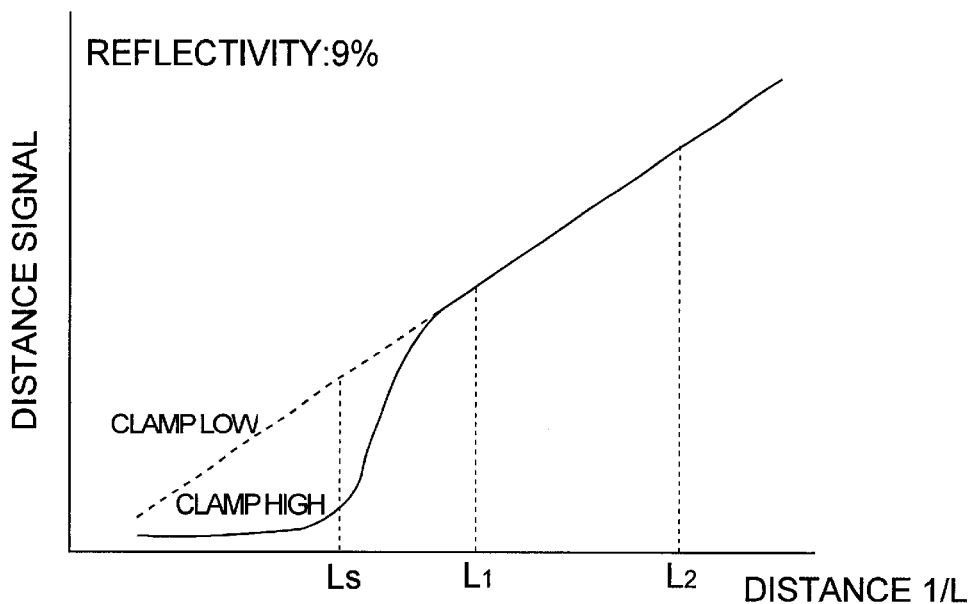

When the reflectivity of the object to be measured is low and the distance to the object is long, the values of the signals $I_1$ and $I_2$ outputted from the PSD 5 become smaller, whereby the distance is likely to be determined as infinity. FIGS. 21A and 21B are graphs for explaining the relationships between the distance to the object to be measured and the distance signal in respective cases where the reflectivity of the object is at a standard value, i.e., 36%, and at a low reflectivity, i.e., 9%. As shown in FIG. 21A, when the reflectivity of the object is at the standard value of 36%, a value substantially proportional to the reciprocal (1/L) of the distance L to the object is obtained as the distance signal. When the reflectivity of the object is at the low reflectivity of 9%, however, as shown in FIG. 21B, though the distance signal attains a value substantially proportional to the reciprocal (1/L) when the distance L to the object is short, it is not proportional to the reciprocal (1/L) and deviates from the permissible range of errors in distance measurement when the distance L is long (e.g., at the distance $L_s$ in the graph).

On the other hand, even when the reflectivity of the object to be measured is thus low, if the value of the clamp signal $I_c$ in the clamping circuit 13 is made low, then the distance signal having a value substantially proportional to the reciprocal (1/L) of the distance L to the object or the distance signal having a value within the permissible range of errors in distance measurement can be obtained. The rangefinder apparatus in accordance with this embodiment utilizes the foregoing features, thereby accurately determining the distance to the object even when the object has a low reflectivity and the distance to the object is long.

A specific procedure of operations in the rangefinder apparatus in accordance with this embodiment will now be explained. FIG. 22 is a flowchart for explaining operations of the rangefinder apparatus in accordance with this embodiment. The operations mentioned in the following are carried out under the control of the CPU 1. Also, $L_1$ and $L_2$ in the following explanations are different from those explained in conjunction with FIGS. 19 and 20, respectively.

When the release button (not depicted) is half-pushed, the CPU 1 initially inputs the value of external light luminance measured by the photometric sensor 71, and determines if thus measured external light luminance value is smaller than a predetermined luminance value or not (step S1). If the external light luminance value is at the predetermined luminance value or greater, the stop can be narrowed at the time of exposure, whereby photographing can be carried out with less defocusing even if the amount of extension of the taking lens 8 is not accurate. Therefore, in this case, regardless of the reflectivity of the object and the distance thereto, the CPU 1 sets the clamp signal value in the clamping circuit 13 to a normal value $I_{c1}$ (first level, e.g., 1.5 nA), sets the number of accumulating operations of the output ratio signal in the integrating circuit 15 to a normal number of $N_0$ (e.g., 300), detects a distance measurement value according to the integrated signal outputted from the integrating circuit 15, and determines the distance to the object according to this distant measurement value (step S2). This distance measuring operation is the same as that explained above.

On the other hand, if the external light luminance value is smaller than the predetermined luminance value, it is necessary to accurately determine the distance to the object and correctly control the extension of the taking lens 8. Therefore, in this case, the distance to the object is determined as follows. First, the CPU 1 sets the clamp signal value in the clamping circuit 13 to the normal value of $I_{c1}$ (first level), sets the number of accumulating operations of the output ratio signal in the integrating circuit 15 to $N_1$ (first number, e.g., 50) which is smaller than the normal number of $N_0$, and detects a distance measurement value $D_1$ (first distance measurement value) according to the integrated signal outputted from the integrating circuit 15 (step S3). The first distance measurement value $D_1$ detected here does not accurately but roughly represents the distance to the object when the reflectivity of the object is low and the distance is long.

Then, the CPU 1 compares the first distance measurement value $D_1$ and the first reference distance $L_1$ (e.g., 3 m) in terms of magnitude (step S4). If the first distance measurement value $D_1$ is greater than the first reference distance $L_1$, i.e., $L_1 < D_1$, then the CPU 1 sets the clamp signal value in the clamping circuit 13 to $I_{c2}$ (second level, e.g., 0.375 nA) which is lower than the normal value of $I_{c1}$, sets the number of accumulating operations of the output ratio signal in the integrating circuit 15 to $N_2$ (second number, e.g., 50) which is smaller than the normal number of $N_0$, and detects a distance measurement value $D_2$ (second distance measurement value) according to the integrated signal outputted from the integrating circuit 15 (step S5).

Further, the CPU 1 determines the difference obtained by subtracting the first distance measurement value $D_1$ detected at step S3 from the second distance measurement value $D_2$ detected at step S5, and compares this difference with a predetermined value DD in terms of magnitude (step S6). If the difference $(D_2-D_1)$ is greater than the predetermined value DD, then it can be determined that the reflectivity of the object is low, and that the distance measurement value obtained when the clamp signal value in the clamping circuit 13 is smaller is more accurate. Therefore, in this case, the CPU 1 may determine the distance to the object according to the second distance measurement value $D_2$ detected at step S5. However, when the number of accumulating operations $N_2$ of the output ratio signal in the integrating circuit 15 is small at step S5, then the S/N ratio of the second distance measurement value $D_2$ is not favorable. As a consequence, the following operations are carried out in this embodiment.

The CPU 1 sets the clamp signal value in the clamping circuit 13 to $I_{c2}$ (second level), sets the number of accumulating operations of the output ratio signal in the integrating circuit 15 to $N_3$ (third number, e.g., 300), and determines a distance measurement value $D_3$ (third distance measurement value) according to the integrated signal outputted from the integrating circuit 15 (step S7). If the number of accumulating operations $N_3$ of the output ratio signal in the integrating circuit 15 is large enough, then the CPU 1 can determine the distance to the object with a favorable S/N ratio according to the third distance measurement value $D_3$.

In this embodiment, the CPU 1 obtains a weighted average of the second distance measurement value $D_2$ detected at step S5 and the third distance measurement value $D_3$ detected at step S7, thereby determining the distance to the object with a favorable S/N ratio (step S8). Upon this weighted averaging, the weighting is effected according to the respective numbers of accumulating operations $N_2$ and $N_3$ at steps S5 and S7, such that the third distance measurement value $D_3$ is weighted more than the second distance measurement value $D_2$ if the number $N_3$ is greater than the number $N_2$.

If the difference $(D_2-D_1)$ is not greater than the predetermined value DD at step S6, then it can be determined that the reflectivity of the object is relatively high, and that the distance measurement value is accurate even if the clamp signal value in the clamping circuit 13 is high. Therefore, in this case, the CPU 1 may determine the distance to the object according to the first distance measurement value $D_1$ detected at step S3. However, when the number of accumulating operations $N_1$ of the output ratio signal in the integrating circuit 15 is small at step S3, then the S/N ratio of the first distance measurement value $D_1$ is not favorable. As a consequence, the following operations are carried out in this embodiment.

The CPU 1 sets the clamp signal value in the clamping circuit 13 to $I_{c1}$ (first level), sets the number of accumulating operations in the integrating circuit 15 to $N_4$ (fourth number, e.g., 200), and determines a distance measurement value $D_4$ (fourth distance measurement value) according to the integrated signal outputted from the integrating circuit 15 (step S9). If the number of accumulating operations $N_4$ of the output ratio signal in the integrating circuit 15 is large enough, then the CPU 1 can determine the distance to the object with a favorable S/N ratio according to the fourth distance measurement value $D_4$.

In this embodiment, the CPU 1 obtains a weighted average of the first distance measurement value $D_1$ detected at step S3 and the fourth distance measurement value $D_4$ detected at step S9, thereby determining the distance to the object with a favorable S/N ratio (step 10). Upon this weighted averaging, the weighting is effected according to the respective numbers of accumulating operations $N_1$ and $N_4$ at steps S3 and S9, such that the fourth distance measurement value $D_4$ is weighted more than the first distance measurement value $D_1$ if the number $N_4$ is greater than the number $N_1$.

If the firs t distance measurement value $D_1$ is not greater than the first reference distance $L_1$ at step $S_4$, then the CPU 1 further compares the first distance measurement value $D_1$ with a second reference distance $L_2$ ($L_2 < L_1$; e.g., 1 m) in terms of magnitude (step S11). If the first distance measurement value $D_1$ is greater than the second reference distance $L_2$, i.e., $L_2 < D_1 L_1$, then the CPU 1 sets the clamp signal value in the clamping circuit 13 to the normal value of $I_{c1}$ (first level), sets the number of accumulating operations of the output ratio signal in the integrating circuit 15 to $N_5$ (fifth number, e.g., 100) which is smaller than the normal number of $N_0$, and detects a distance measurement value $D_5$ (fifth distance measurement value) according to the integrated signal outputted from the integrating circuit 15 (step S12). If the number of accumulating operations $N_5$ of the output ratio signal in the integrating circuit 15 is large enough, then the CPU 1 can determine the distance to the object with a favorable S/N ratio according to the fifth distance measurement value $D_5$.

In this embodiment, the CPU 1 obtains a weighted average of the first distance measurement value $D_1$ detected at step S3 and the fifth distance measurement value $D_5$ detected at step S12, thereby determining the distance to the object with a favorable S/N ratio (step S13). Upon this weighted averaging, the weighting is effected according to the respective numbers of accumulating operations $N_1$ and $N_5$ at steps S3 and S12, such that the fifth distance measurement value $D_5$ is weighted more than the first distance measurement value $D_1$ if the number $N_5$ is greater than the number $N_1$.

If the first distance measurement value $D_1$ is not greater than the second reference distance $L_2$ at step Sll, i.e., $D_1 L_2$, then the CPU 1 determines the distance to the object according to the first distance measurement value $D_1$ detected at step S3. In this case, since each of the near-side signal $I_1$ and far-side signal $I_2$ outputted from the PSD 5 has a large value, whereas the steady-state light component $I_0$ and noise component $I_n$ which become noise are relatively very small, the distance to the object can be determined according to the first distance measurement value $D_1$ with a sufficiently favorable S/N ratio even if the number of accumulating operations $N_1$ is small.

Thus, according to the rough distance to the object to be measured, the reflectivity of the object, and the external light luminance value, a distance measuring operation is carried out with the level of the clamp signal $I_c$ in the clamping circuit 13 and the number of accumulating operations of the output ratio signal in the integrating circuit 15 being appropriately set, and the distance to the object is accurately determined according to the resulting distance measurement value. Thereafter, when the release button is completely pushed, the CPU 1 controls the lens driving circuit 7 according to thus determined distance, so as to cause the taking lens 8 to effect an appropriate focusing action, and carries out exposure by opening the shutter (not depicted).

Operations of the rangefinder apparatus in accordance with this embodiment will now be explained with reference to the results of calculations shown in FIGS. 23 to 32.

Figure 23:
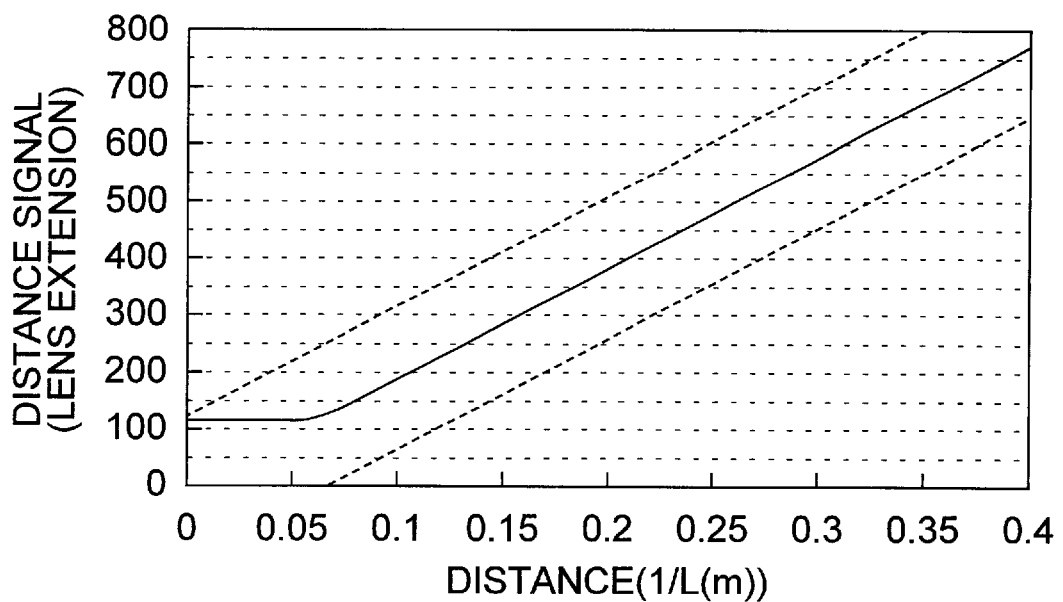
FIG. 23 is a graph showing the relationship between the distance signal and the distance in the case where the clamp signal is at a first level $I_{c1}$ (1.5 nA) and the reflectivity of the object to be measured is 36%.
Figure 24:
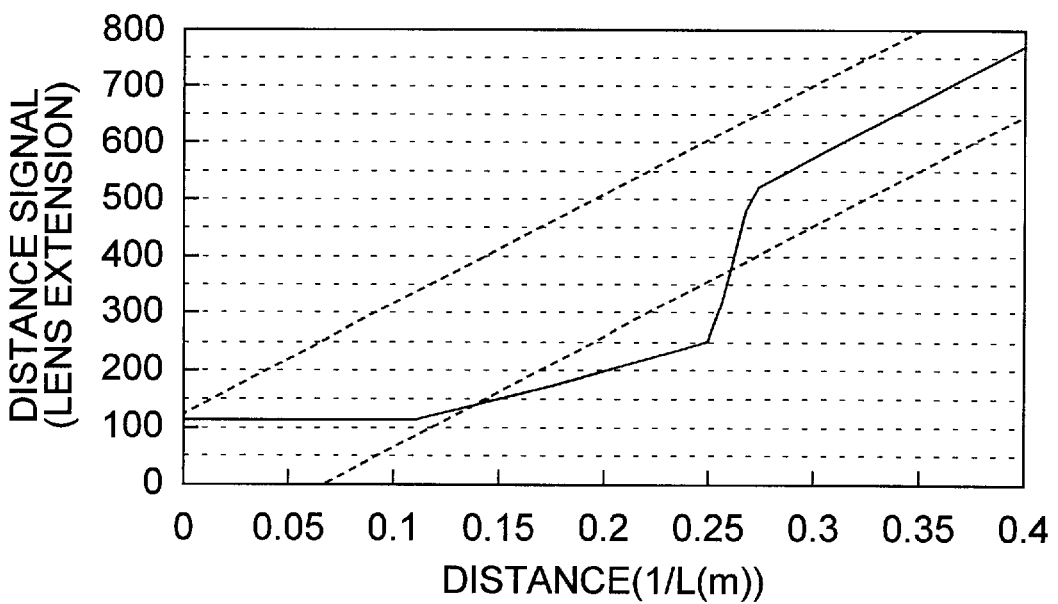
FIG. 24 is a graph showing the relationship between the distance signal and the distance in the case where the clamp signal is at the first level $I_{c2}$ (1.5 nA) and the reflectivity of the object to be measured is 9%.
Figure 25:
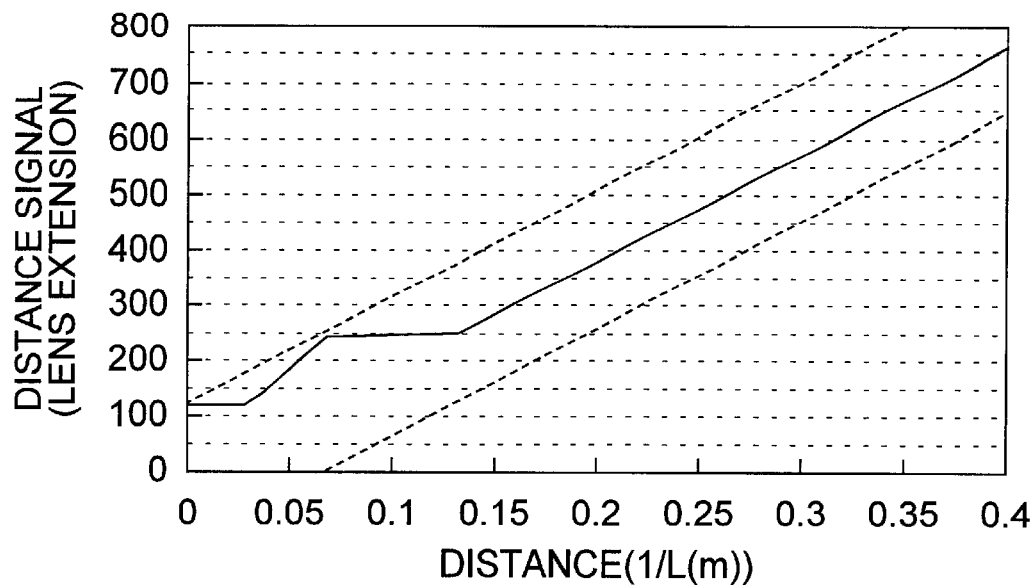
FIG. 25 is a graph showing the relationship between the distance signal and the distance in the case where the clamp signal is at a second level $I_{c2}$ (0.375 nA) and the reflectivity of the object to be measured is 36%.
Figure 26:
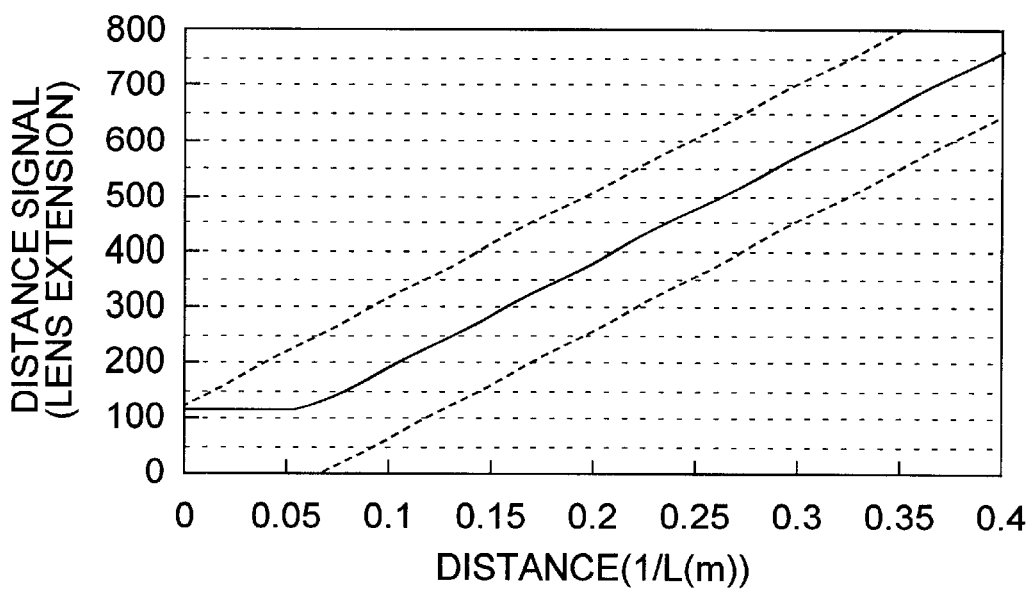
FIG. 26 is a graph showing the relationship between the distance signal and the distance in the case where the clamp signal is at the second level $I_{c2}$ (0.375 nA) and the reflectivity of the object to be measured is 9%.

FIG. 23 is a graph showing the relationship between the distance signal and the distance when the clamp signal is at the first level $I_c$ (1.5 nA) and the reflectivity of the object to be measured is at the standard value, i.e., 36%. FIG. 24 is a graph showing the relationship between the distance signal and the distance when the clamp signal is at the first level $I_{c1}$ (1.5 nA) and the reflectivity of the object is lower, i.e., 9%. FIG. 25 is a graph showing the relationship between the distance signal and the distance when the clamp signal is at the second level $I_{c2}$ (0.375 nA) and the reflectivity of the object is 36%. FIG. 26 is a graph showing the relationship between the distance signal and the distance when the clamp signal is at the second level $I_{c2}$ (0.375 nA) and the reflectivity of the object is 9%. In these graphs, two broken lines parallel to each other represent the permissible range of errors in distance measurement.

As shown in FIG. 23, when the clamp signal is at the higher first level $I_{c1}$ and the reflectivity of the object is at the standard value, the distance signal always lies within the permissible range of errors in distance measurement. However, as shown in FIG. 24, when the clamp signal is at the higher first level $I_{c1}$ and the reflectivity of the object is lower, the distance signal deviates from the permissible range of errors in distance measurement where the reciprocal 1/L of the distance L (m) to the object is approximately 0.14 to 0.26. On the other hand, as shown in each of FIGS. 25 and 26, when the clamp signal is at the lower second level $I_{c2}$, the distance signal always lies within the permissible range of errors in distance measurement regardless of the reflectivity value of the object.

Figure 1:
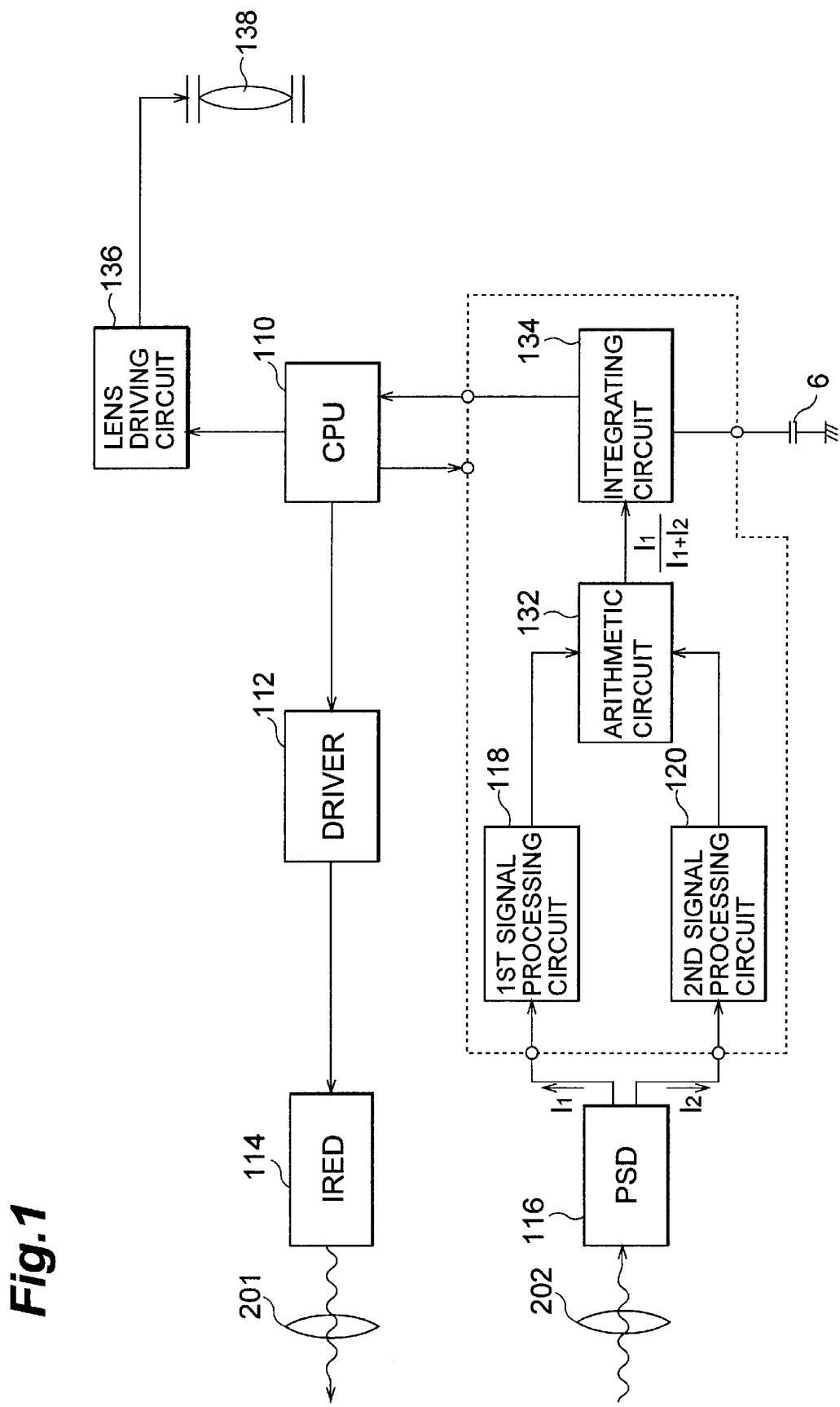
FIG. 1 is a configurational view of the rangefinder apparatus in accordance with the first prior art.
Figure 2:
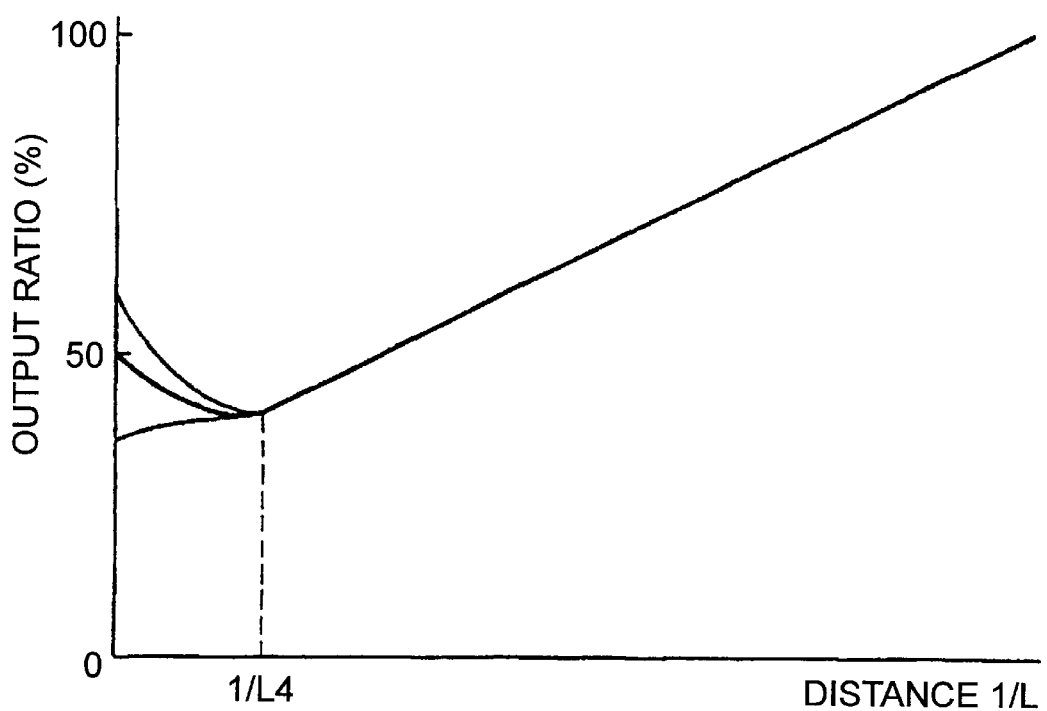
FIG. 2 is a graph showing the relationship between the AF signal outputted from the integrating circuit in the first prior art and the distance to the object to be measured.
Figure 3:
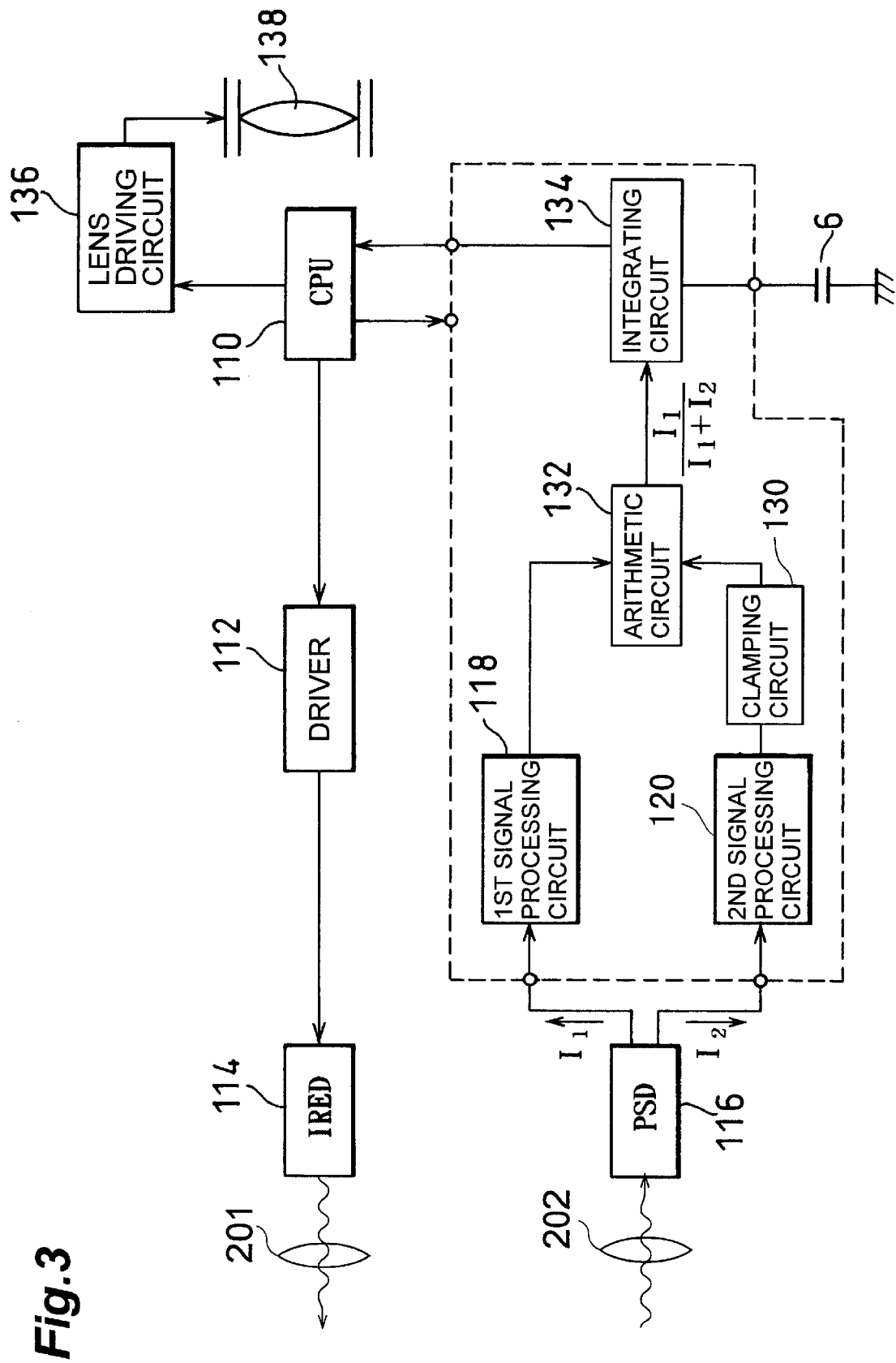
FIG. 3 is a configurational view of a modified example of the rangefinder apparatus in accordance with the first prior art.
Figure 4:
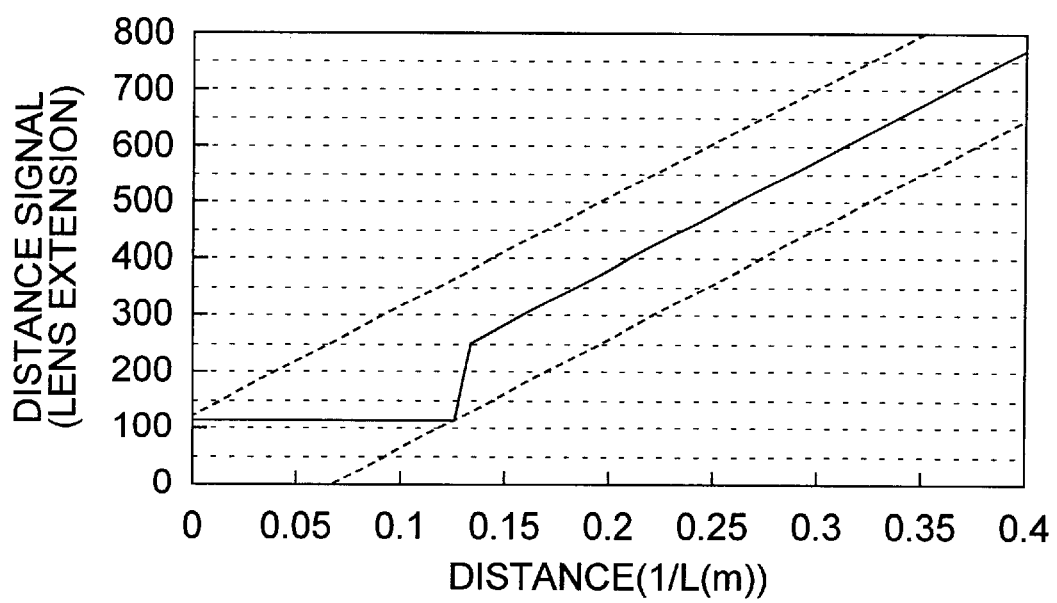
FIG. 4 is a graph showing the relationship between the distance signal obtained by the rangefinder apparatus in accordance with the first prior art and the distance when the reflectivity of the object to be measured is 36%.
Figure 5:
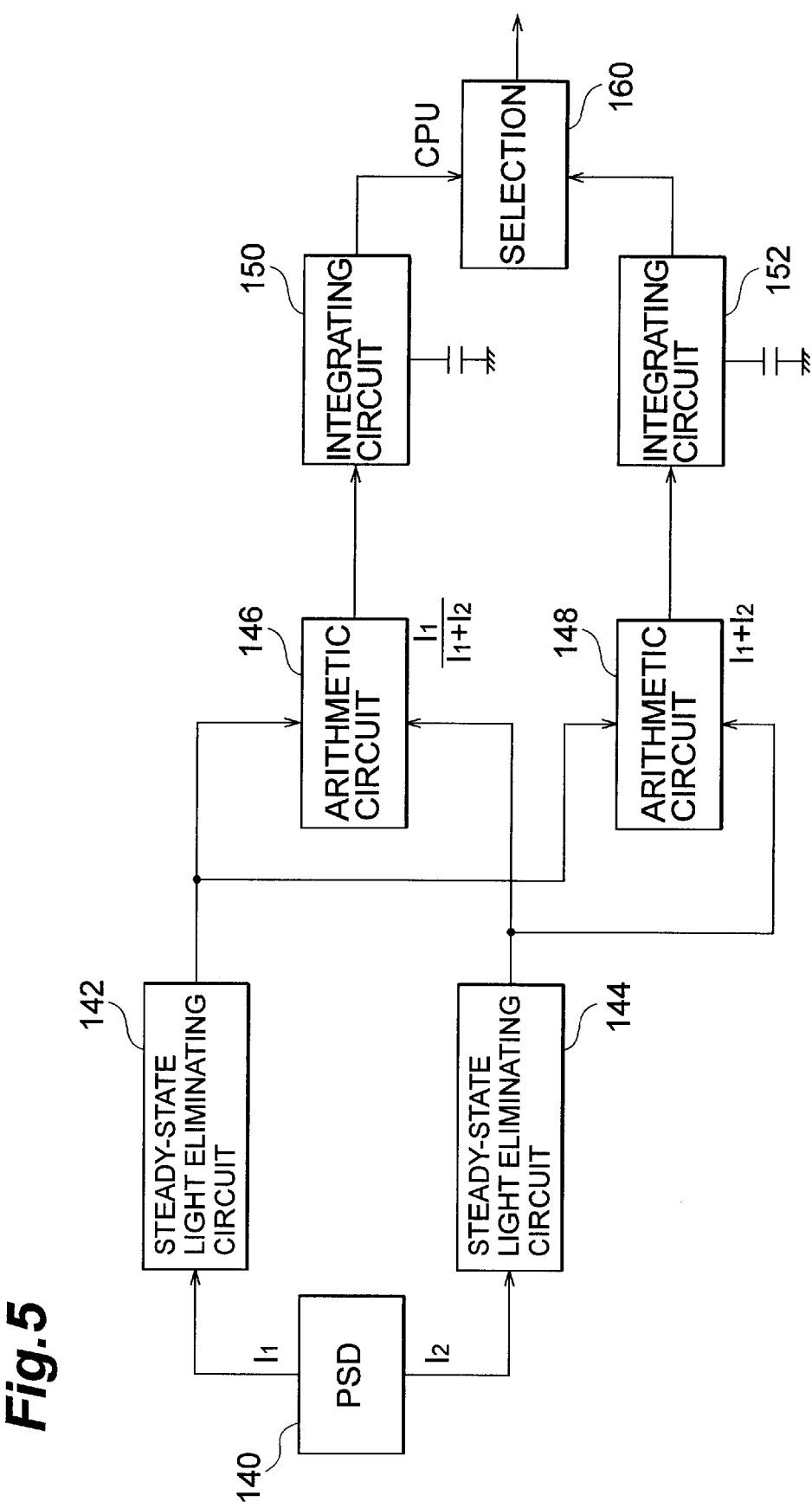
FIG. 5 is a configurational view of the rangefinder apparatus in accordance with the second prior art.
Figure 6:
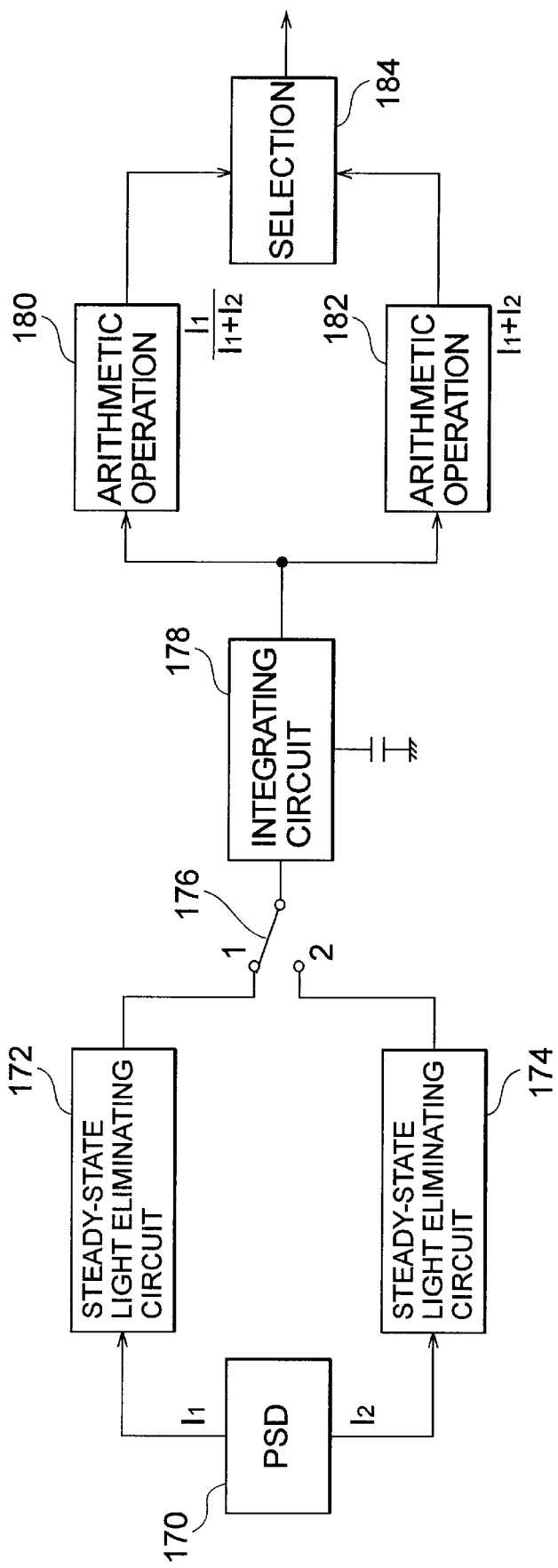
FIG. 6 is a configurational view of the rangefinder apparatus in accordance with the third prior art.
Figure 7:
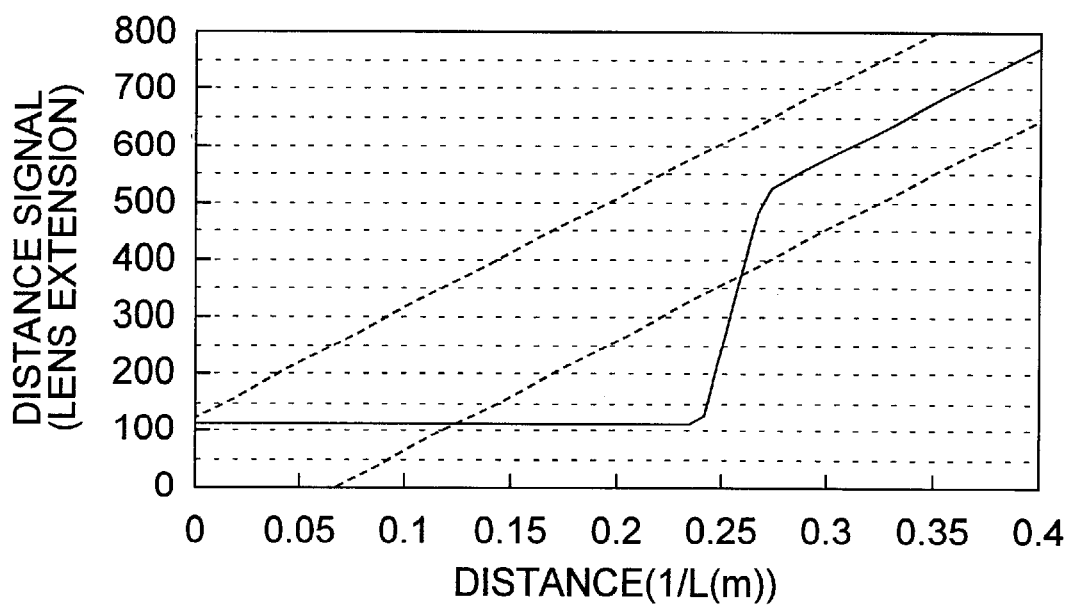
FIG. 7 is a graph showing the relationship between the distance signal obtained by the rangefinder apparatus in accordance with the first prior art and the distance when the reflectivity of the object to be measured is 9%.
Figure 8:
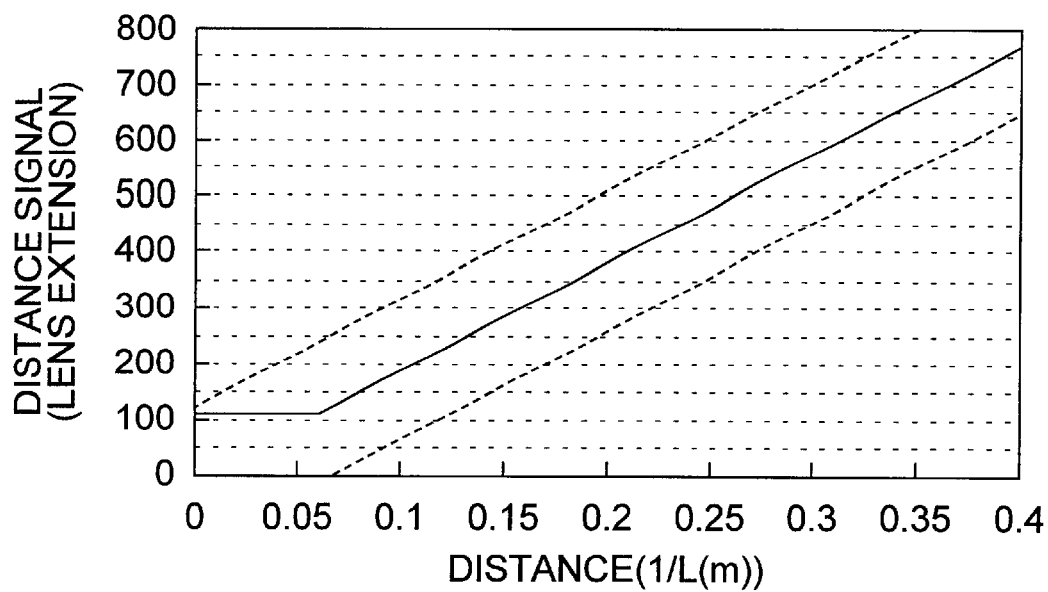
FIG. 8 is a graph showing the relationship between the distance signal obtained by each of the rangefinder apparatus in accordance with the second and third prior art examples and the distance when the reflectivity of the object to be measured is 36%.
Figure 9:
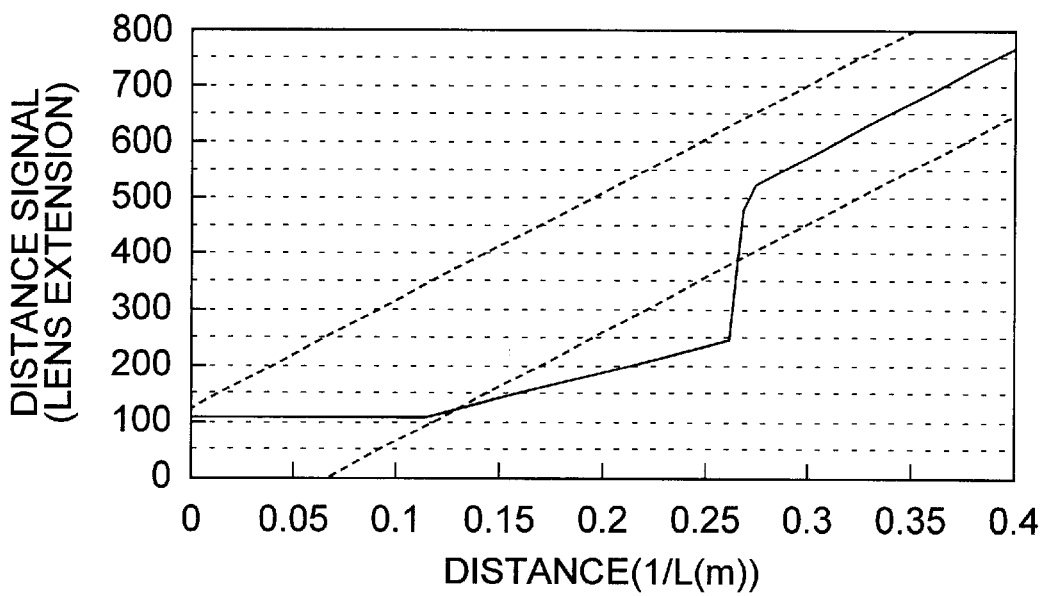
FIG. 9 is a graph showing the relationship between the distance signal obtained by each of the rangefinder apparatus in accordance with the second and third prior art examples and the distance when the reflectivity of the object to be measured is 9%.
Figure 10:
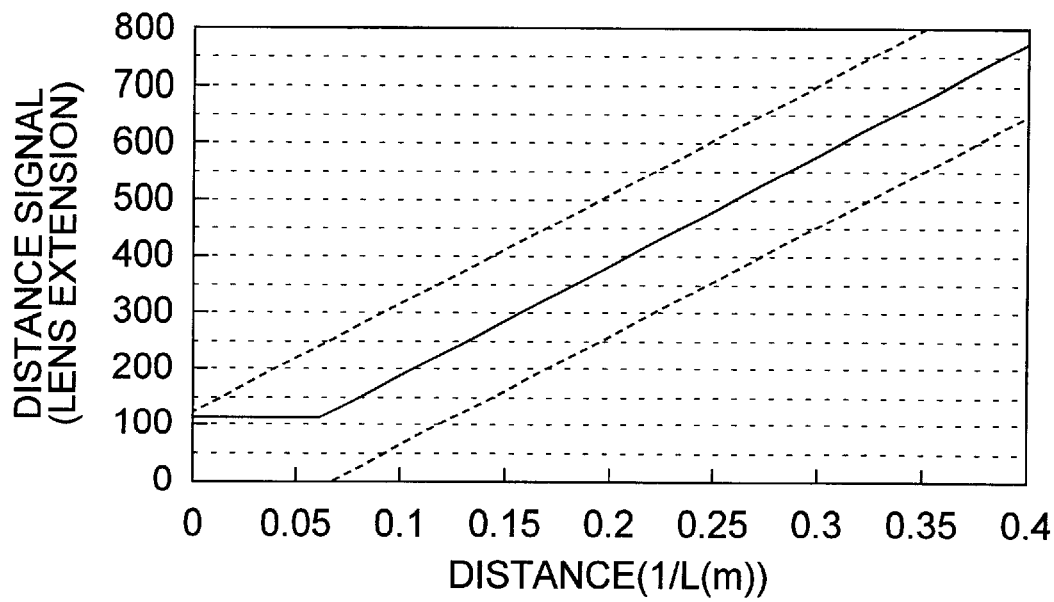
FIG. 10 is a graph showing the relationship between the distance signal obtained by the rangefinder apparatus in accordance with the first prior art and the distance when the level of the clamp signal $I_c$ is set low and the reflectivity of the object to be measured is 36%.
Figure 11:
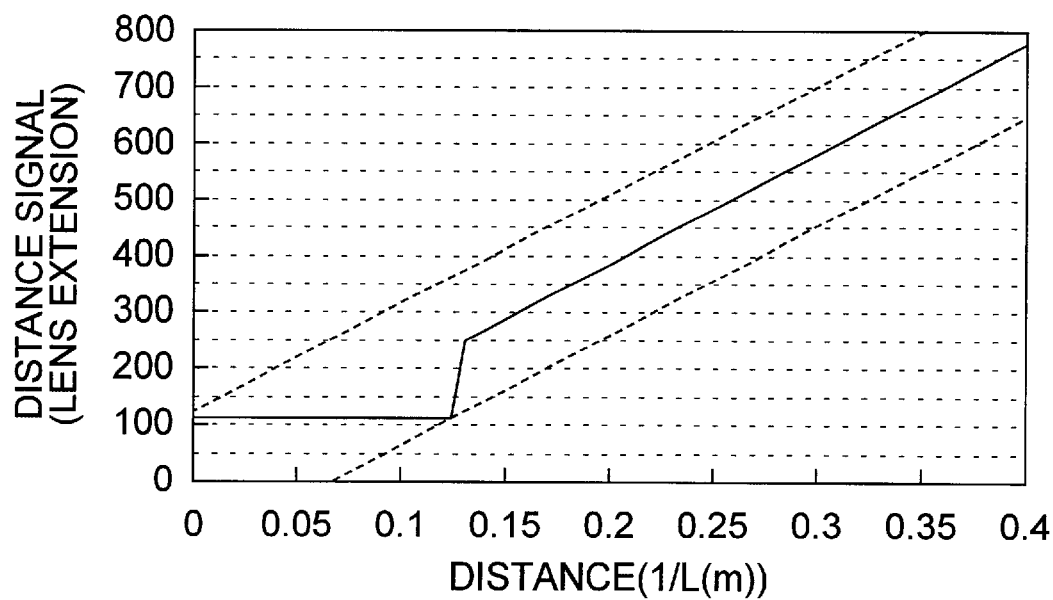
FIG. 11 is a graph showing the relationship between the distance signal obtained by the rangefinder apparatus in accordance with the first prior art and the distance when the level of the clamp signal $I_c$ is set low and the reflectivity of the object to be measured is 9%.
Figure 12:
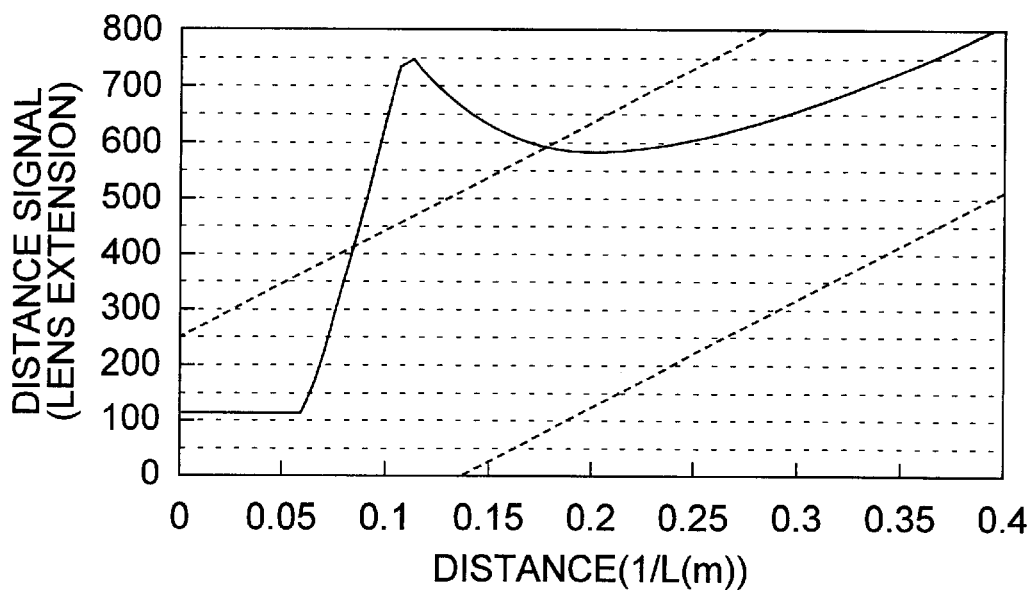
FIG. 12 is a graph showing the relationship between the distance signal obtained by the rangefinder apparatus in accordance with the first prior art and the distance when the level of the clamp signal $I_c$ is set low, the external light luminance is high, and the reflectivity of the object to be measured is 36%.
Figure 13:
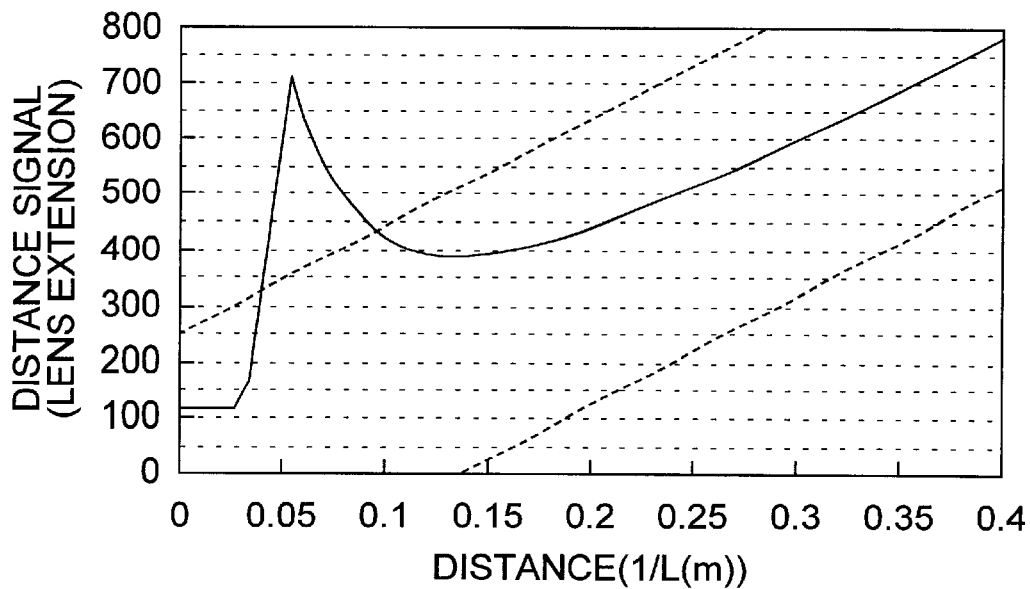
FIG. 13 is a graph showing the relationship between the distance signal obtained by the rangefinder apparatus in accordance with the first prior art and the distance when the level of the clamp signal $I_c$ is set low, the external light luminance is high, and the reflectivity of the object to be measured is 9%.
Figure 14:
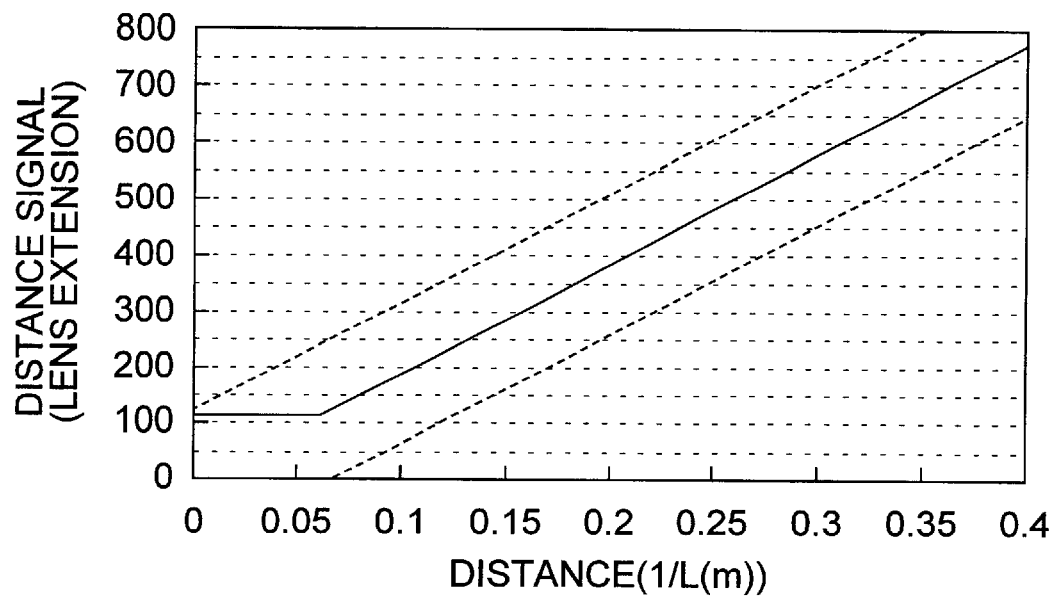
FIG. 14 is a graph showing the relationship between the distance signal obtained by the rangefinder apparatus in accordance with the first prior art and the distance when the quantity of light projected from the IRED is quadrupled and the reflectivity of the object to be measured is 36%.
Figure 15:
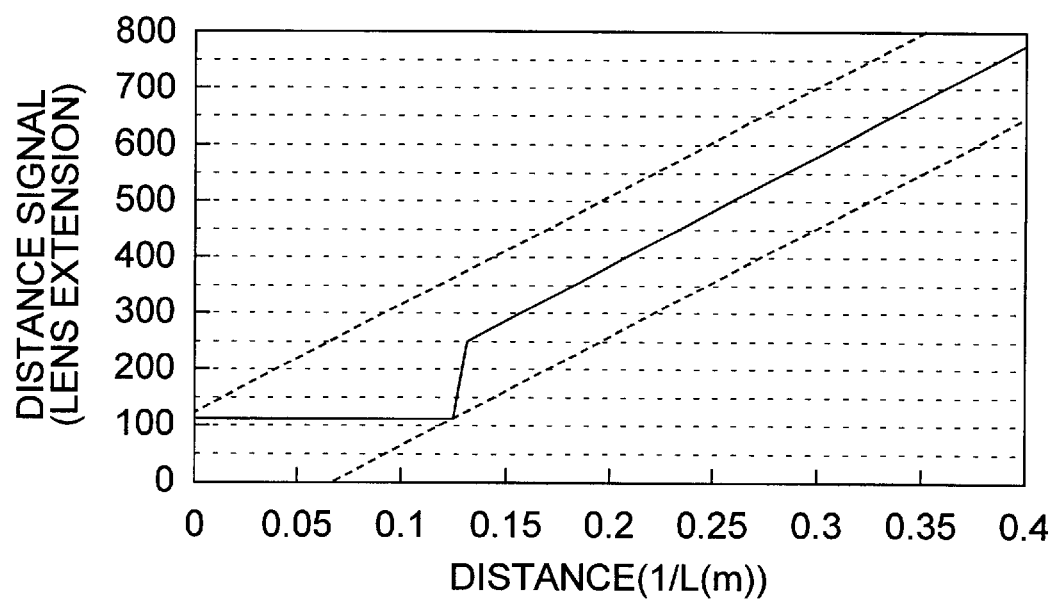
FIG. 15 is a graph showing the relationship between the distance signal obtained by the rangefinder apparatus in accordance with the first prior art and the distance when the quantity of light projected from the IRED is quadrupled and the reflectivity of the object to be measured is 9%.
Figure 27:
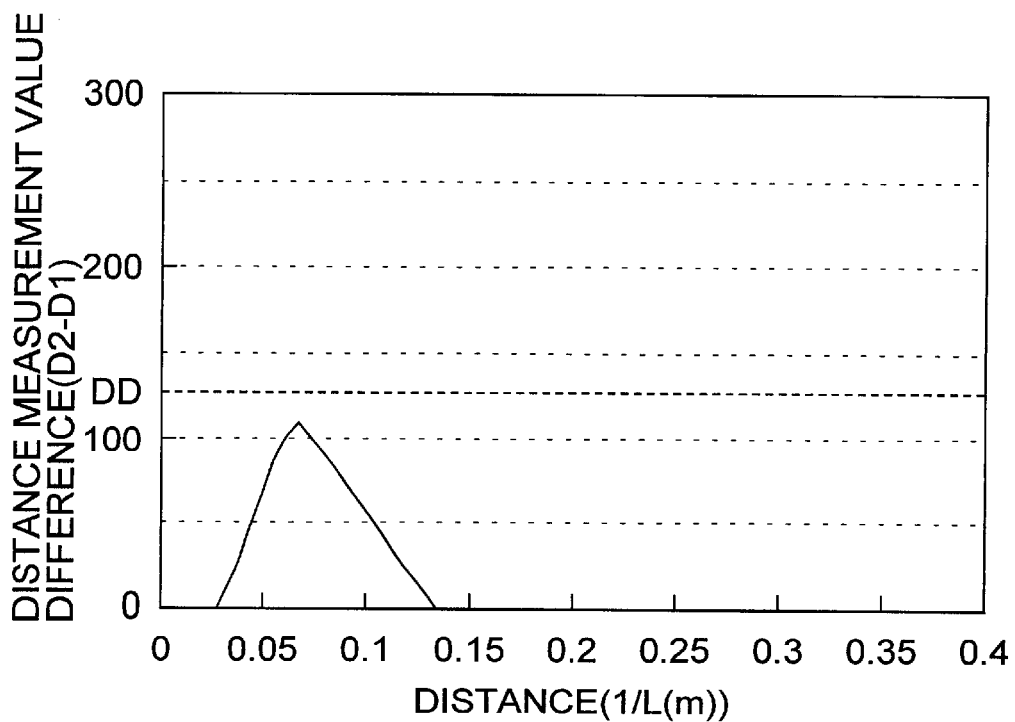
FIG. 27 is a graph showing the relationship between the difference ($D_2$–$D_1$) obtained by subtracting a first distance measurement value $D_1$ from a second distance measurement value $D_2$ in the case where the reflectivity of the object to be measured is 36%.
Figure 28:
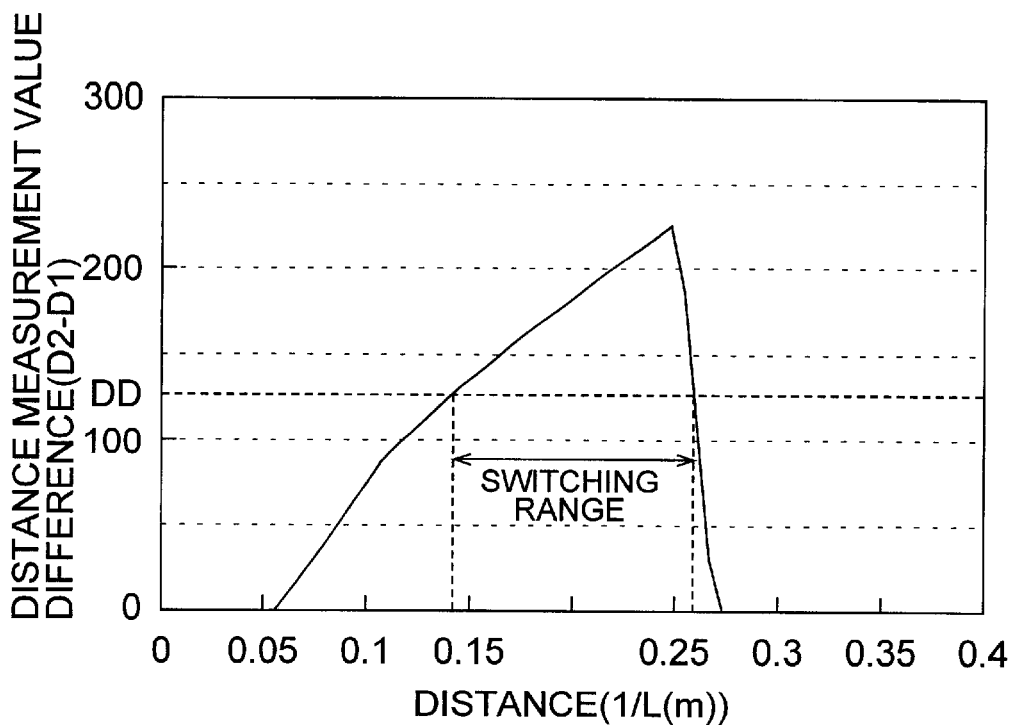
FIG. 28 is a graph showing the relationship between the difference ($D_2$–$D_1$) obtained by subtracting the first distance measurement value $D_1$ from the second distance measurement value $D_2$ in the case where the reflectivity of the object to be measured is 9%.

FIG. 27 is a graph showing the relationship between the difference ($D_2 - D_1$) obtained by subtracting the first distance measurement value $D_1$ from the second distance measurement value $D_2$ and the distance when the reflectivity of the object to be measured is at the standard value, i.e., 36%. This graph is determined from FIGS. 8 and 10. FIG. 13 is a graph showing the relationship between the difference ($D_2 - D_1$) obtained by subtracting the first distance measurement value $D_1$ from the second distance measurement value $D_2$ and the distance when the reflectivity of the object is lower, i.e., 9%. This graph is determined from FIGS. 24 and 26. In these graphs, the broken line indicates the predetermined value DD to be compared with ($D_2 - D_1$) in terms of magnitude. The predetermined value DD is the value of the whole width of the permissible range of errors in distance measurement.

As can be seen from FIG. 27, when the reflectivity of the object is at the standard value, the difference ($D_2 - D_1$) is always smaller than the predetermined value DD. On the other hand, as can be seen from FIG. 28, when the reflectivity value of the object is low, within the range (switching range) where the reciprocal 1/L of the distance L (m) to the object is approximately 0.14 to 0.26, the difference ($D_2 - D_1$) is greater than the predetermined value DD. Hence, in the rangefinder apparatus in accordance with this embodiment, when the difference ($D_2 - D_1$) is greater than the predetermined value DD, i.e., within the switching range, it is determined that the reflectivity value of the object is low, and a distance measuring operation is carried out with the clamp signal being set to the lower second level $I_{c2}$. Thus determined distance signal lies within the permissible range of errors in distance measurement.

Figure 29:
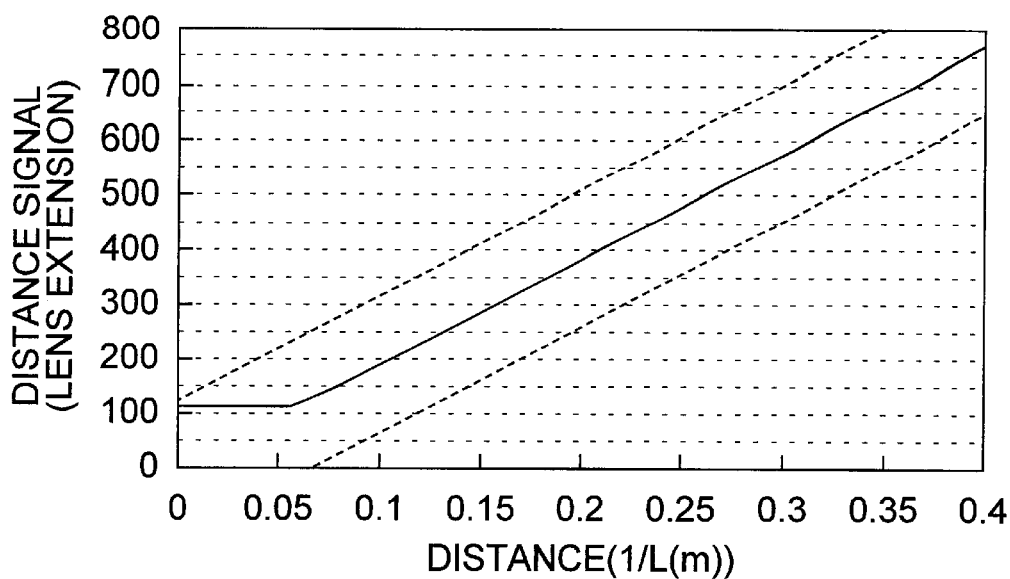
FIG. 29 is a graph showing the relationship between the distance signal obtained by the rangefinder apparatus in accordance with the above-mentioned embodiment and the distance when the reflectivity of the object to be measured is 36%.
Figure 30:
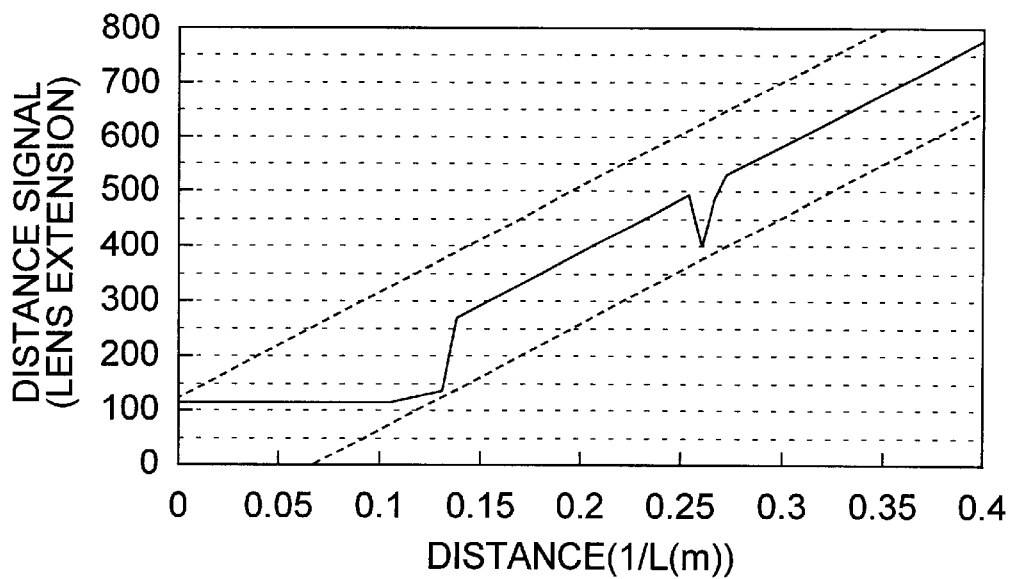
FIG. 30 is a graph showing the relationship between the distance signal obtained by the rangefinder apparatus in accordance with the above-mentioned embodiment and the distance when the reflectivity of the object to be measured is 9%.

FIG. 29 is a graph showing the relationship between the distance signal obtained by the rangefinder apparatus in accordance with this embodiment and the distance when the reflectivity of the object to be measured is at the standard value, i.e., 36%. FIG. 30 is a graph showing the relationship between the distance signal obtained by the rangefinder apparatus in accordance with this embodiment and the distance when the reflectivity of the object is lower, i.e., 9%. When the reflectivity of the object is at the standard value, i.e., 36%, since the difference ($D_2-D_1$) is always smaller than the predetermined value DD, the distance signal is determined by carrying out a distance measuring operation with the clamp signal being set to the higher first level $I_{c1}$, whereby FIG. 29 is identical to FIG. 23. On the other hand, when the reflectivity of the object is lower, i.e., 9%, the distance signal is determined by carrying out a distance measuring operation with the clamp signal being set to the lower second level $I_{c2}$ within the switching range, whereas the distance signal is determined by carrying out a distance measuring operation with the clamp signal being set to the higher first level $I_{c1}$ outside the switching range. As a consequence, even when the reflectivity of the object to be measured is low, the distance signal always lies within the permissible range of errors in distance measurement.

Figure 31:
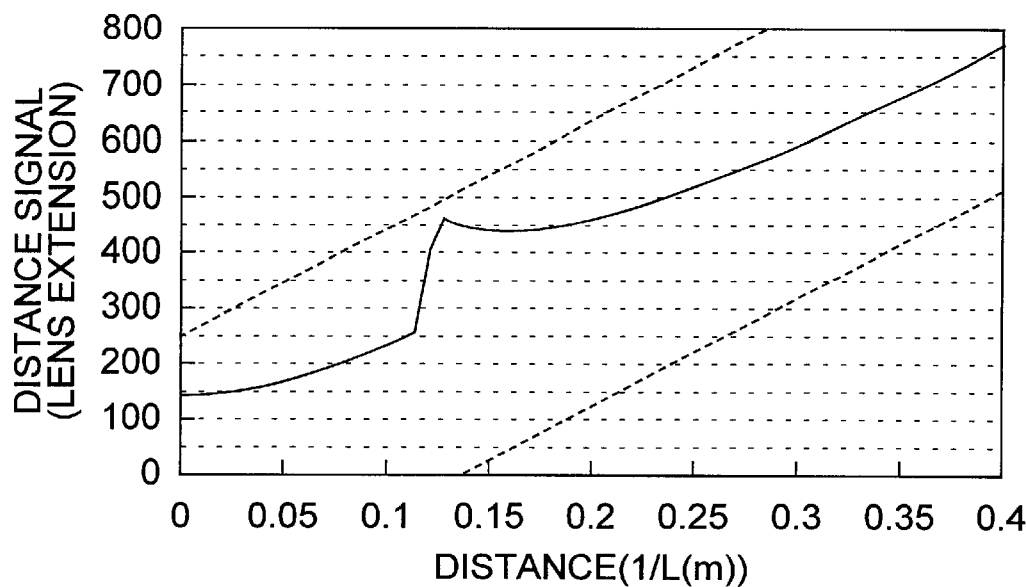
FIG. 31 is a graph showing the relationship between the distance signal obtained by the rangefinder apparatus in accordance with the above-mentioned embodiment and the distance when the reflectivity of the object to be measured is 36% and the external light luminance is high.
Figure 32:
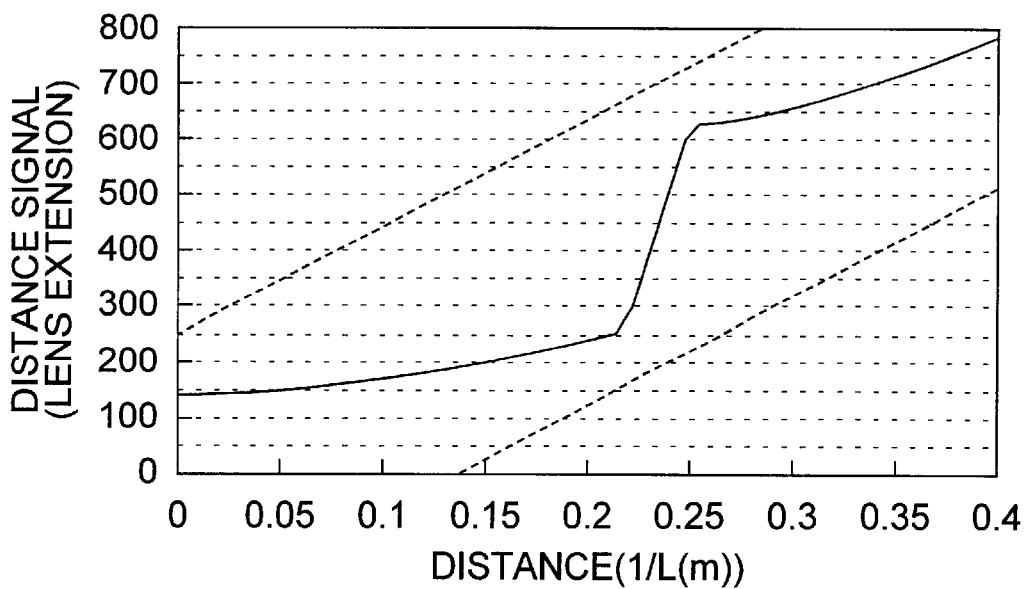
FIG. 32 is a graph showing the relationship between the distance signal obtained by the rangefinder apparatus in accordance with the above-mentioned embodiment and the distance when the reflectivity of the object to be measured is 9% and the external light luminance is high.

FIG. 31 is a graph showing the relationship between the distance signal obtained by the rangefinder apparatus in accordance with this embodiment and the distance when the reflectivity of the object to be measured is at the standard value, i.e., 36%, and the external light luminance is high. FIG. 32 is a graph showing the relationship between the distance signal obtained by the rangefinder apparatus in accordance with this embodiment and the distance when the reflectivity of the object is lower, i.e., 9%, and the external light luminance is high. As can be seen from these graphs, when the external light luminance is high, the permissible range of errors in distance measurement is wide, whereby the distance signal always lies within the permissible range of errors in distance measurement regardless of the reflectivity value of the object.

The operations and effects of the rangefinder apparatus in accordance with this embodiment explained in the foregoing will be summarized as follows. When the first distance measurement value $D_1$ is greater than the first reference distance $L_1$ ($D_1>L_1$) and the difference ($D_2-D_1$) obtained by subtracting the first distance measurement value $D_1$ detected with the clamp signal $I_{c1}$ from the second distance measurement value $D_2$ detected with the clamp signal $I_{c2}$ ($I_{c2}<I_{c1}$) is greater than the predetermined value DD, the distance to the object is determined according to the distance measurement value (the second distance measurement value $D_2$, the third distance measurement value $D_3$, or a weighted average value of them) detected with the clamp signal $I_{c2}$ having the smaller value (steps S7 and S8). Namely, in this case, it is determined that the reflectivity of the object is low and the distance thereto is long, whereby the distance can accurately be determined by carrying out the distance measuring operation with the clamp signal value being set low. Also, when the distance is determined according to the weighted average value of the second distance measurement value $D_2$ and the third distance measurement value $D_3$, if the number of accumulating operations $N_2$ upon detecting the second distance measurement value $D_2$ is made small, then the time required for determining whether the reflectivity is high or low and whether the distance is long or short can be shortened, and since the distance is determined according to the second distance measurement value $D_2$ as well, the total time required for the distance measurement can be shortened.

When the first distance measurement value $D_1$ is greater than the first reference distance $L_1$ ($D_1>L_1$) and the difference ($D_2-D_1$) is not greater than the predetermined value DD, the distance to the object is determined according to the distance measurement value (the first distance measurement value $D_1$, the fourth distance measurement value $D_4$, or a weighted average value of them) detected with the clamp signal $I_{c1}$, having the normal value (steps S9 and S10). Namely, in this case, it is determined that the reflectivity of the object is relatively high, although it is determined that the distance to the object is long, whereby the distance can accurately be determined by carrying out the distance measuring operation with the clamp signal value being set to the normal value. Also, when the distance is determined according to the weighted average value of the first distance measurement value $D_1$ and the fourth distance measurement value $D_4$, if the number of accumulating operations $N_1$ upon detecting the first distance measurement value $D_1$ is made small, then the time required for determining whether the reflectivity is high or low and whether the distance is long or short can be shortened, and since the distance is determined according to the first distance measurement value $D_1$ as well, the total time required for the distance measurement can be shortened.

When the first distance measurement value $D_1$ is greater than the second reference distance $L_2$ but not greater than the first reference distance $L_1$ ($L_2<D_1 L_1$), the distance to the object is determined according to the distance measurement value (the first distance measurement value $D_1$, the fifth distance measurement value $D_5$, or a weighted average value of them) detected with the clamp signal $I_{c1}$ having the normal value (steps S12 and S13). Namely, in this case, it is determined that the distance to the object is in a medium range, whereby the distance can accurately be determined, regardless of the reflectivity of the object, by carrying out the distance measuring operation with the clamp signal value being set to the normal value, even if the number of accumulating operations $N_1$ or $N_5$ is smaller than the normal number $N_0$. Also, when the distance is determined according to the weighted average value of the first distance measurement value $D_1$ and the fifth distance measurement value $D_5$, if the number of accumulating operations $N_1$ upon detecting the first distance measurement value $D_1$ is made small, then the time required for determining whether the reflectivity is high or low and the distance is long or short can be shortened, and since the distance is determined according to the first distance measurement value $D_1$ as well, the total time required for the distance measurement can be shortened. Also, if the number of accumulating operations $N_5$ upon detecting the fifth distance measurement value $D_5$ is made small, then the total time required for the distance measurement can further be shortened.

When the first distance measurement value $D_1$ is not greater than the second reference distance $L_2$ ($D_1 L_2$), the distance to the object is determined according to the first distance measurement value $D_1$ detected with the clamp signal $I_{c1}$ having the normal value at step S3. Namely, in this case, it is determined that the distance to the object is short, whereby the distance can accurately be determined, regardless of the reflectivity of the object, by carrying out the distance measuring operation with the clamp signal value being set to the normal value, even if the number of accumulating operations $N_1$ is smaller than the normal number $N_0$. Also, since the number of accumulating operations $N_1$ can be made smaller than the normal number $N_0$, the total time required for the distance measurement can be shortened.

Also, when the external light luminance value measured by the photometric sensor 71 is at a p redetermined luminance value or greater, the distance to the object can accurately be determined, regardless of the reflectivity of the object and the distance thereto, by carrying out the distance measuring operation with the clamp signal value being set to the normal value $I_{c1}$ and the number of accumulating operations being set to the normal number of $N_0$. Also, the operations can be changed according to a circle of confusion determined by the film sensitivity, the F number and focal length of the taking lens, and so forth.

Second Embodiment

The rangefinder apparatus in accordance with the second embodiment will now be explained. The rangefinder apparatus in accordance with this embodiment differs from that of the first embodiment in its procedure of operations. FIG. 33 is a flowchart for explaining operations of the rangefinder apparatus in accordance with the second embodiment.

The CPU 1 sets the clamp signal value in the clamping circuit 13 to $I_{c1}$, sets the number of accumulating operations of the output ratio signal in the integrating circuit 15 to $N_1$ (e.g., 50) which is smaller than the normal number $N_0$, and detects a distance measurement value $D_1$ according to the integrated signal outputted from the integrating circuit 15 (step S21). The distance measurement value $D_1$ detected here does not accurately but roughly represents the distance to the object when the reflectivity of the object is low and the distance is long. Subsequently, the CPU 1 sets the clamp signal value in the clamping circuit 13 to $I_{c2}$, sets the number of accumulating operations of the output ratio signal in the integrating circuit 15 to $N_2$ (e.g., 50) which is smaller than the normal number $N_0$, and detects a distance measurement value $D_2$ according to the integrated signal outputted from the integrating circuit 15 (step S22). Further, the CPU 1 sets the clamp signal value in the clamping circuit 13 to $I_{c3}$, sets the number of accumulating operations of the output ratio signal in the integrating circuit 15 to $N_3$ (e.g., 50) which is smaller than the normal number $N_0$, and detects a distance measurement value $D_3$ according to the integrated signal outputted from the integrating circuit 15 (step S23). Preferably, the clamp signal levels $I_{c1}$ to $I_{c3}$ are values different from each other, one of which is a normal value, whereas the other two are smaller than the normal value. Here, $I_{c1}$ is the normal value, and $I_{c1} > I_{c2} > I_{c3}$.

Then, the CPU 1 detects the difference obtained by subtracting the distance measurement value $D_1$ detected at step S21 from the distance measurement value $D_3$ detected at step S23, and compares this difference with a predetermined value $DD_1$ in terms of magnitude (step S24). If the difference ($D_3-D_1$) is greater than the predetermined value $DD_1$, then it can be determined that the reflectivity of the object to be measured is low, whereby the distance measurement value obtained when the clamp signal value in the clamping circuit 13 is smaller is more accurate. Therefore, in this case, the CPU 1 may determine the distance to the object according to the distance measurement value $D_3$ detected at step S23. However, when the number of accumulating operations $N_3$ of the output ratio signal in the integrating circuit 15 is small at step S23, then the S/N ratio of the distance measurement value $D_3$ is not favorable. As a consequence, the following operations are carried out in this embodiment.

The CPU 1 sets the clamp signal value in the clamping circuit 13 to $I_3$, sets the number of accumulating operations of the output ratio signal in the integrating circuit 15 to $N_4$ (e.g., 300), and determines a distance measurement value $D_4$ according to the integrated signal outputted from the integrating circuit 15 (step S25). If the number of accumulating operations $N_4$ of the output ratio signal in the integrating circuit 15 is large enough, then the CPU 1 can determine the distance to the object with a favorable S/N ratio according to this distance measurement value $D_4$.

In this embodiment, the CPU 1 obtains a weighted average of the distance measurement value $D_3$ detected at step S23 and the distance measurement value $D_4$ detected at step S25, thereby determining the distance to the object with a favorable S/N ratio (step S26). Upon this weighted averaging, the weighting is effected according to the respective numbers of accumulating operations $N_3$ and $N_4$ at steps S23 and S25, such that the distance measurement value $D_4$ is weighted more than the distance measurement value $D_3$ if the number $N_4$ is greater than the number $N_3$.

If the difference ($D_3-D_1$) is not greater than the predetermined value $DD_1$ at step S24, then the difference obtained by subtracting the distance measurement value $D_1$ detected at step S21 from the distance measurement value $D_2$ detected at step S22 is determined, and this difference is compared with a predetermined value $DD_2$ in terms of magnitude (step S27). If the difference ($D_2-D_1$) is greater than the predetermined value $DD_2$, then it can be determined that the reflectivity of the object is in a medium range. Therefore, in this case, the CPU 1 may determine the distance to the object according to the distance measurement value $D_2$ detected at step S22. However, when the number of accumulating operations $N_2$ of the output ratio signal in the integrating circuit 15 is small at step S22, then the S/N ratio of the distance measurement value $D_2$ is not favorable. As a consequence, the following operations are carried out in this embodiment.

The CPU 1 sets the clamp signal value in the clamping circuit 13 to $I_{c2}$, sets the number of accumulating operations of the output ratio signal in the integrating circuit 15 to $N_5$ (e.g., 300), and determines a distance measurement value $D_5$ according to the integrated signal outputted from the integrating circuit 15 (step S28). If the number of accumulating operations $N_5$ of the output ratio signal in the integrating circuit 15 is large enough, then the CPU 1 can determine the distance to the object with a favorable S/N ratio according to this distance measurement value $D_5$.

In this embodiment, the CPU 1 obtains a weighted average of the distance measurement value $D_2$ detected at step S22 and the distance measurement value $D_5$ detected at step S28, thereby determining the distance to the object with a favorable S/N ratio (step S29). Upon this weighted averaging, the weighting is effected according to the respective numbers of accumulating operations $N_2$ and $N_5$ at steps S22 and S28, such that the distance measurement value $D_5$ is weighted more than the distance measurement value $D_2$ if the number $N_5$ is greater than the number $N_2$.

Also, if the difference ($D_2-D_1$) is not greater than the predetermined value $DD_2$ at step S27, then it can be determined that the reflectivity of the object is high. Therefore, in this case, the CPU 1 may determine the distance to the object according to the distance measurement value $D_1$ detected at step S21. However, when the number of accumulating operations $N_1$ of the output ratio signal in the integrating circuit 15 is small at step S21, then the S/N ratio of the first distance measurement value $D_1$ is not favorable. As a consequence, the following operations are carried out in this embodiment.

The CPU 1 sets the clamp signal value in the clamping circuit 13 to $I_{c1}$, sets the number of accumulating operations of the output ratio signal in the integrating circuit 15 to $N_6$ (e.g., 300), and determines a distance measurement value $D_6$ according to the integrated signal outputted from the integrating circuit 15 (step S30). If the number of accumulating operations $N_6$ of the output ratio signal in the integrating circuit 15 is large enough, then the CPU 1 can determine the distance to the object with a favorable S/N ratio according to this distance measurement value $D_6$.

In this embodiment, the CPU 1 obtains a weighted average of the distance measurement value $D_1$ detected at step S21 and the distance measurement value $D_6$ detected at step S30, thereby determining the distance to the object with a favorable S/N ratio (step S31). Upon this weighted averaging, the weighting is effected according to the respective numbers of accumulating operations $N_1$ and $N_6$ at steps S21 and S30, such that the distance measurement value $D_6$ is weighted more than the distance measurement value $D_1$ if the number $N_6$ is greater than the number $N_1$.

Thus, in this embodiment, without comparing the respective distance measurement values detected at steps S21 to 23 with a reference distance, the individual distance measurement values are determined with their respective clamp signals being set to a plurality of levels, and an appropriate clamp signal level is determined according to differences among the individual distance measurement values, whereby the accuracy in distance measurement can be improved.

Without being restricted to the above-mentioned embodiments, the present invention can be modified in various manners. For example, the present invention is also applicable to the case where the charging/discharging of the integrating circuit is the reverse of that in the above-mentioned embodiments, i.e., the integrating circuit in which a plurality of charging operations are carried out in the first integration such that the voltage of the integrating capacitor 6 increases stepwise and then only one discharging operation is carried out in the second integration.

Though the numbers of accumulating operations in the first embodiment are set such that each of $N_1$ and $N_2$ is 50, $N_3$ is 300, $N_4$ is 200, and $N_5$ is 100, they are not restricted thereto. Also, each of the first integration and second integration can be divided into a plurality of operations. For example, for determining the third distance measurement value $D_3$, an operation for determining a distance measurement value $D_{3n}$ by carrying out the first integration and second integration with the number of accumulating operations being set to 50 may be repeated six times, and the average value of thus obtained distance measurement values $D_{3n}$ (n=1 to 6) may be employed as the third distance measurement value $D_3$.

Though the number of accumulating operations are set to $N_0$ to $N_5$ while the period of each accumulating operation of the output ratio signal in the integrating circuit is made constant in the first embodiment, the present invention is not restricted thereto. The periods of accumulating operations may be set to their respective values while the number of accumulating operations of the output ratio signal in the integrating circuit is kept constant, the number of accumulating operations of the output ratio signal in the integrating circuit and the periods of individual accumulating operations may be set to their respective values, or the sum of periods of accumulating operations may be set to a certain value. For example, while the period of each accumulating operation is made constant, the period of each accumulating operation for determining the fifth distance measurement value may be set to a value twice as much as that of each accumulating operation for determining the first distance measurement value.

Further, the integrating current flowing into the integrating capacitor 6 may be increased or decreased in the first integration. For example, with the period of each accumulating operation and the number of accumulating operations being constant, the integrating current of each accumulating operation for determining the fifth distance measurement value may be set to a value twice as much as that of each accumulating operation for determining the first distance measurement value.

Also, without comparing the first distance measurement value $D_1$ and the second reference distance $L_2$ with each other in terms of magnitude (step S11), the procedure may shift to step S7 or S2 even when $D_1$ $L_1$. On the contrary, some reference distances may further be provided in addition to the first reference distance $L_1$ and the second reference distance $L_2$, so as to determine the distance to the object in a further number of stages, thereby carrying out the distance measurement.

Also, with the clamp signal being set to a third level which is lower than the second level $I_{c2}$, and the sum of the periods of accumulating operations of the output ratio signal in the integrating circuit being set to a predetermined number, a distance measurement value may be detected according to the integrated signal outputted from the integrating circuit, and the distance to the object to be measured may be determined according thus detected distance measurement value when the difference obtained by subtracting the second distance measurement value from this distance measurement value is greater than a predetermined value. Similarly, the clamp signal may be set to a further lower fourth level. Thus, when individual distance measurement values are determined with their respective clamp signals being set to a number of levels, and differences among the individual distance measurement values are determined, the reflectivity of the object to be measured can be determined in a number of stages, whereby the distance to the object can be determined further accurately.

While the distance to the object is obtained on the basis of the time needed in the second integration, it may also be obtained on the basis of the result of the A/D conversion of the integrated voltage value obtained by the first integration, namely, the voltage value which is reduced due to the discharge of integrating capacitor or the voltage value which is increased due to the charge of integrating capacitor.

As explained in detail in the foregoing, in accordance with the present invention, the clamp signal is set to a first level, the sum of periods of accumulating operations of the output ratio signal in the integrating means is set to a first number, and a first distance measurement value is detected according to an integrated signal outputted from the integrating means. If this first distance measurement value is greater than a first reference distance, then the clamp signal is set to a second level which is lower than the first level, the sum of periods of accumulating operations of the output ratio signal in the integrating means is set to a second number, and a second distance measurement value is detected according to the integrated signal outputted from the integrating means.

If the difference obtained by subtracting the first distance measurement value from the second distance measurement value is greater than a predetermined value, then the clamp signal is set to the second level, the sum of periods of accumulating operations of the output ratio signal in the integrating means is set to a third number, a third distance measurement value is detected according to the integrated signal outputted from the integrating means, and the distance to the object is determined according to the third distance measurement value. Alternatively, the distance to the object is determined according to the already detected second distance measurement value or both of the second distance measurement value and the third distance measurement value. In this case, it is determined that the reflectivity of the object is low and the distance to the object is long, whereby the distance can accurately be determined if the distance is measured with the clamp signal value being set low.

If the external light luminance measured by the luminance measuring means is lower than a predetermined luminance value, effects substantially similar to those mentioned above are obtained, though it does not matter whether the first level is greater or smaller than the second level. On the other hand, if the external light luminance measured by the luminance measuring means is not greater than the predetermined luminance value, regardless of the reflectivity of the object and the distance thereto, the distance is measured with the clamp signal being set to the greater level and the sum of periods of accumulating operations of the output ratio signal in the integrating means being set to a predetermined number. As a consequence, the distance to the object can be determined accurately.

If the above-mentioned difference is not greater than the predetermined value, the clamp signal is set to the first level, the sum of accumulating periods of the output ratio signal in the integrating means is set to a fourth number, a fourth distance measurement value is detected according to the integrated signal outputted from the integrating means, and the distance to the object is determined according to the fourth distance measurement value. Alternatively, the distance to the object is determined according to the already detected first distance measurement value or both of the first distance measurement value and the fourth distance measurement value. In this case, it is determined that the reflectivity of the object is relatively high, though it is determined that the distance to the object is long, whereby the distance can be determined accurately if the distance measurement is carried out with the clamp signal value being set to the normal value.

Therefore, the rangefinder apparatus in accordance with the present invention can determine the distance to the object to be measured not only when the reflectivity of the object is high or the distance thereto is short, but also when the reflectivity of the object is low and the distance thereto is long. Also, as compared with the prior art, the distance can be measured with a smaller circuit size in a shorter time.

When the first distance measurement value is not greater than the first reference distance, the distance can be measured accurately in a further shorter time if the clamp signal is set to the normal first level while the sum of periods of accumulating operations of the output ratio signal in the integrating means is made smaller than the normal predetermined number.

When a weighted average of the first or second distance measurement value used for determining the reflectivity of the object and the distance thereto and the third, fourth, or fifth distance measurement value obtained according to the result of determination is obtained, so as to yield the distance to the object, the time required for the above-mentioned determination can be shortened if each of the first number, which is the sum of periods of accumulating operations for detecting the first distance measurement value, and the second number, which is the sum of periods of accumulating operations for detecting the second distance measurement value, is made smaller. Also, in this case, if the distance is determined according to not only the third, forth, or fifth distance measurement value, but also the first or second distance measurement value, the total time required for the distance measurement can be shortened, and the accuracy in distance measurement can be improved.

The accuracy in distance measurement can also be improved if individual distance measurement values are determined with their respective clamp signals being set to a plurality of levels, and an appropriate clamp signal level is determined according to differences among the individual distance measurement values.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:
1. A rangefinder apparatus comprising:
light-projecting means for projecting a luminous flux toward an object at a distance to be measured;
light-detecting means for detecting reflected light of the luminous flux projected toward the object at a light-detecting position on a position sensitive detector, corresponding to the distance to the object, and outputting, according to the light-detecting position, a far-side signal increasing in value as the distance increases if the detected light is constant, and a near-side signal increasing in value as the distance decreases if the detected light is constant;
clamping means receiving the far-side signal, comparing the far-side signal with a clamp signal in terms of magnitude, and outputting the far-side signal if the far-side signal is at least equal to the clamp signal and outputting the clamp signal if not;
arithmetic means for calculating a ratio between the near-side signal and the signal output from said clamping means and outputting a thus-obtained output ratio signal;
integrating means for accumulating and integrating the output ratio signal and outputting an integrated signal corresponding to the integrating; and
control means for controlling the projecting of the luminous flux by said light-projecting means, the clamp signal in said clamping means, and a sum of periods of accumulating operations of the output ratio signal in said integrating means, and detecting a distance measurement value according to the integrated signal output from said integrating means, said control means setting the clamp signal to a first level, setting the sum of periods of accumulating operations of the output ratio signal in said integrating means to a first number, and detecting a first distance measurement value according to the integrated signal output from said integrating means, wherein,
when the first distance measurement value is larger than a first reference distance, said control means further sets the clamp signal to a second level lower than the first level, sets the sum of periods of accumulating operations of the output ratio signal in said integrating means to a second number, and detects a second distance measurement value according to the integrated signal output from said integrating means, and
when the first distance measurement value is larger than the second distance measurement value by not less than a threshold value, said control means sets the clamp signal to the second level, sets the sum of periods of accumulating operations of the output ratio signal in said integrating means to a third number, detects a third distance measurement value according to the integrated signal output from said integrating means, and determines the distance to the object according to at least one of the second distance measurement value and the third distance measurement value.

2. The rangefinder apparatus according to claim 1, wherein, when the difference between the first distance measurement value and the second distance measurement value is not larger than the threshold value, said control means sets the clamp signal to the first level, sets the sum of periods of accumulating operations of the output ratio signal in said integrating means to a fourth number, detects a fourth distance measurement value according to the integrated signal output from said integrating means, and determines the distance to the object according to at least one of the first distance measurement value and the fourth distance measurement value.

3. The rangefinder apparatus according to claim 1, wherein, when the first distance measurement value is larger than a second reference distance but not larger than the first reference distance, said control means sets the clamp signal to the first level, sets the sum of periods of accumulating operations of the output ratio signal in said integrating means to a fourth number, detects a fourth distance measurement value according to the integrated signal output from said integrating means, and determines the distance to the object according to the fourth distance measurement value.

4. The rangefinder apparatus according to claim 3, wherein, when the first distance measurement value is not larger than the second reference distance, said control means determines the distance to the object according to the first distance measurement value.

5. The rangefinder apparatus according to claim 1, wherein, when the difference between the first distance measurement value and the second distance measurement value is larger than the threshold value, said control means determines the distance to the object by obtaining a weighted average of the second distance measurement value and the third distance measurement value according to the third number.

6. The rangefinder apparatus according to claim 2, wherein, when the distance is not larger than the threshold value, said control means determines the distance to the object by obtaining a weighted average of the first distance measurement value and the fourth distance measurement value according to the fourth number.

7. The rangefinder apparatus according to claim 3 wherein said control means determines the distance to the object by obtaining a weighted average of the first distance measurement value and the fourth distance measurement value according to the fourth number.

8. A rangefinder apparatus comprising:
light-projecting means for projecting a luminous flux toward an object at a distance to be measured;
light-detecting means for detecting reflected light of the luminous flux projected toward the object at a light-detecting position on a position sensitive detector, corresponding to the distance to the object, and outputting, according to the light-detecting position, a far-side signal increasing in value as the distance increases if the detected light is constant, and a near-side signal increasing in value as the distance decreases if the detected light is constant;
clamping means receiving the far-side signal, comparing the far-side signal with a clamp signal in terms of magnitude, and outputting the far-side signal if the far-side side signal is at least equal to the clamp signal and outputting the clamp signal if not;
arithmetic means for calculating a ratio between the near-side signal and the signal output from said clamping means and outputting a thus-obtained output ratio signal;
integrating means for accumulating and integrating the output ratio signal and outputting an integrated signal corresponding to the integrating;
control means for controlling the projecting of the luminous flux by said light-projecting means, the clamp signal in said clamping means, and a sum of periods of accumulating operations of the output ratio signal in said integrating means, and detecting a distance measurement value according to the integrated signal output from said integrating means; and
luminance measuring means for measuring external light luminance, wherein,
when the external light luminance measured by said luminance measuring means is lower than a threshold luminance value, said control means sets the clamp signal to a first level, sets the sum of accumulating operations of the output put ratio signal in said integrating means to a first number, and detects a first distance measurement value according to the integrated signal output from said integrating means;
when the first distance measurement value is larger than a first reference distance, said control means further sets the clamp signal to a second level different from the first level, sets the sum of periods of accumulating operations of the output ratio signal in said integrating means to a second number, and detects a second distance measurement value according to the integrated signal output from said integrating means;
when one of the first and second distance measurement values having a clamp signal at a higher level is larger by not less than a threshold value than clamp signals of other distance measurement values having a clamp signal at a lower level, said control means sets the clamp signal to the lower level, sets the sum of periods of accumulating operations of the output ratio signal in said integrating means to a third number, detects a third distance measurement value, and determines the distance to the object according to at least one of the third distance measurement value and the distance measurement value obtained when the clamp signal is at the lower level; and
when the external light luminance measured by said luminance measuring means is at least the threshold luminance value, said control means sets the clamp signal to the higher level, sets the sum of periods of accumulating operations of the output ratio signal in said integrating means to a fixed number, detects a distance measurement value according to the integrated signal output from said integrating means, and determines the distance to the object according to a thus-obtained detected distance measurement value.

9. The rangefinder apparatus according to claim 8, wherein, when the first distance measurement value is larger than a second reference distance but not larger than the first reference distance, said control means sets the clamp signal to the first level, sets the sum of periods of accumulating operations of the output ratio signal in said integrating means to a fourth number, detects a fourth distance measurement value according to the integrated signal output from said integrating means, and determines the distance to the object according to the fourth distance measurement value.

10. The rangefinder apparatus according to claim 9, wherein, when the first distance measurement value is not larger than the second reference distance, said control means determines the distance to the object according to the first distance measurement value.

11. The rangefinder apparatus according to claim 9, wherein said control means determines the distance to the object by obtaining a weighted average of the first distance measurement value and the fourth distance measurement value according to the first number and the fourth number.

12. A rangefinder apparatus comprising:

light-projecting means for projecting a luminous flux toward an object at a distance to be measured;

light-detecting means for detecting reflected light of the luminous flux projected toward the object at a light-detecting position on a position sensitive detectors corresponding to the distance to the objects and outputting, according to the light-detecting position, a far-side signal increasing in value as the distance increases if the detected light is constant, and a near-side signal increasing in value as the distance decreases if the detected light is constant;

clamping means receiving the far-side signal, comparing the far-side signal with a clamp signal in terms of magnitude, and outputting the far-side signal if the far-side side signal is at least equal to the clamp signal and outputting the clamp signal if not;

arithmetic means for calculating a ratio between the near-side signal and the signal output from said clamping means and outputting a thus-obtained output ratio signal;

integrating means for accumulating and integrating the output ratio signal and outputting an integrated signal corresponding to the integrating; and control means for controlling the projecting of the luminous flux by said light-projecting means, the clamp signal in said clamping means, and a sum of periods of accumulating operations of the output ratio signal in said integrating means, and detecting a distance measurement value according to the integrated signal output from said integrating means, said control means setting the clamp signal to a plurality of levels, and detecting a plurality of distance measurement values according to respective integrated signals output from said integrating means with respect to the plurality of levels, wherein, when the plurality of distance measurement values include those obtained with the clamp signal set to the highest of the levels, which is larger by not less than a threshold value than the distance measurement value obtained with the clamp signal set to a lower level, said control means employs the distance measurement value detected with respect to the clamp signal having the lowest of the levels among the larger distance measurement values as a first distance measurement value, and employs the sum of periods of accumulating operations of the output ratio signal in said integrating means as a first number; and said control means sets the clamp signal to the lowest level, sets the sum of periods of accumulating operations of the output ratio signal in said integrating means to a second number, detects a second distance measurement value according to the integrated signal output from said integrating means, and determines the distance to the object according to at least one of the first distance measurement value and the second distance measurement value.

13. The rangefinder apparatus according to claim 12, wherein, when the plurality of distance measurement values does not include distance measurement values obtained with the clamp signal set to the highest level, which is larger than by not less than the threshold value than the distance measurement value obtained with the clamp signal set to the lower level, said control means employs the distance measurement value detected with respect to the clamp signal having the highest level as a third distance measurement value, and employs the sum of periods of accumulating operations of the output ratio signal in said integrating means as a third number; and said control means sets the clamp signal to the highest level, sets the sum of periods of accumulating operations of the output ratio signal in said integrating means to a fourth number, detects a fourth distance measurement value according to the integrated signal output from said integrating means, and determines the distance to the object according cording to at least one of the third distance measurement value and the fourth distance measurement value.

14. The rangefinder apparatus according to claim 12, wherein said control means determines the distance to the object by obtaining a weighted average of the first distance measurement value and the second distance measurement value according to the first number and the second number.

15. The rangefinder apparatus according to claim 13, wherein said control means determines the distance to the object by obtaining a weighted average of the third distance measurement value and the fourth distance measurement value according to the third number and the fourth number.

* * * * *